(12) United States Patent
Woodgate et al.

(10) Patent No.: US 6,483,613 B1
(45) Date of Patent: Nov. 19, 2002

(54) REFLECTIVE DISPLAY DEVICE AND A LIGHT SOURCE FOR A DISPLAY DEVICE

(75) Inventors: Graham John Woodgate, Oxfordshire (GB); Marina Vladimirovna Khazova, Oxfordshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/762,339
(22) PCT Filed: Aug. 2, 1999
(86) PCT No.: PCT/JP99/04172
§ 371 (c)(1),
(2), (4) Date: Apr. 30, 2001
(87) PCT Pub. No.: WO00/08519
PCT Pub. Date: Feb. 17, 2000

(30) Foreign Application Priority Data

Aug. 4, 1998 (GB) .............................. 9816957

(51) Int. Cl.[7] .......................... G02B 5/32; G02F 1/1335
(52) U.S. Cl. ............................. 359/19; 359/15; 349/62; 349/63; 349/64; 349/95; 349/104
(58) Field of Search .............................. 359/15, 19, 20, 359/565; 349/65, 95, 104, 61, 62, 63, 64

(56) References Cited

U.S. PATENT DOCUMENTS

| 5,138,495 | A | * | 8/1992 | Shiono et al. ........... 250/201.6 |
| 5,278,008 | A | * | 1/1994 | Moss et al. ..................... 359/12 |
| 5,506,701 | A |   | 4/1996 | Ichikawa ........................ 359/15 |

(List continued on next page.)

FOREIGN PATENT DOCUMENTS

| JP | 09-304725 A | * | 11/1997 |
| WO | 95/12826 |   | 5/1995 |
| EP | 0 826 986 A | * | 3/1998 |
| GB | 2212937 A | * | 8/1989 |
| GB | 2306229 |   | * | 4/1997 |
| JP | 02-273702 A | * | 11/1990 |
| JP | 08-095019 A | * | 4/1996 |
| JP | 09-233263 A | * | 9/1997 |

(List continued on next page.)

OTHER PUBLICATIONS

Patent Abstracts of Japan, vol. 1996, No. 8, 08095019, Apr. 12, 1996.*
G. T. Valliath, et al., "Design of Hologram for Brightness Enhancement in Color LCDs", 1998 SID International Symposium. Digest of Technical Papers. vol. 29, Proc. of SID '98, May 17–22, 1998, Anaheim, CA , pp. 1139–1142.*
Patent Abstracts of Japan, vol. 1998, No. 1, 09233263, Sep. 1997.*
C. Joubert et al.; "Phase Volume Holographic Optical Components for High–Brightness Single–LCD Projectors"; Applied Optics, Jul. 1997, vol. 36, No. 20, pp. 4761–4771.
C. Joubert et al.; "Dispersive Holographic Microlens Matrix for Single LCD Projection"; SPIE, 1996, vol. 2650, pp. 243–252.
T. Hotta et al.; "Holographic Light Control Film for Liquid Crystal Displays"; SPIE, 1998, vol. 3293, pp. 190–195.

*Primary Examiner*—Cassandra Spyrou
*Assistant Examiner*—John Juba, Jr.
(74) *Attorney, Agent, or Firm*—Renner, Otto, Boisselle & Sklar, LLP

(57) ABSTRACT

A reflective liquid crystal display device (LCD) (40) includes: a substrate (60), a reflecting layer (61), a liquid crystal layer (62), an electrode layer (63), a color filter layer (64), an upper substrate (65), and a polarizer (66). The reflective liquid crystal display device further includes a holographic field lens (67). By providing the holographic field lens, the LCD can be used with a closely placed, offset light source (41), since the holographic field lens simultaneously concentrates light incident on the LCD and redirects it in a preferred direction. The holographic field lens can be provided within the structure of the LCD.

41 Claims, 39 Drawing Sheets

U.S. PATENT DOCUMENTS

| | | | |
|---|---|---|---|
| 5,594,560 A | | 1/1997 | Jelley et al. .................. 359/15 |
| 5,610,733 A | * | 3/1997 | Feldman et al. ......... 250/201.6 |
| 5,815,293 A | * | 9/1998 | Komma et al. ............... 359/19 |
| 6,008,941 A | * | 12/1999 | Feldman et al. ............ 359/565 |
| 6,166,834 A | * | 12/2000 | Taketomi et al. ............. 70/135 |

FOREIGN PATENT DOCUMENTS

| | | | |
|---|---|---|---|
| WO | | 96/37805 | 11/1996 |
| WO | | 97/34174 | 9/1997 |
| WO | WO 98 38536 A | * | 9/1998 |

* cited by examiner

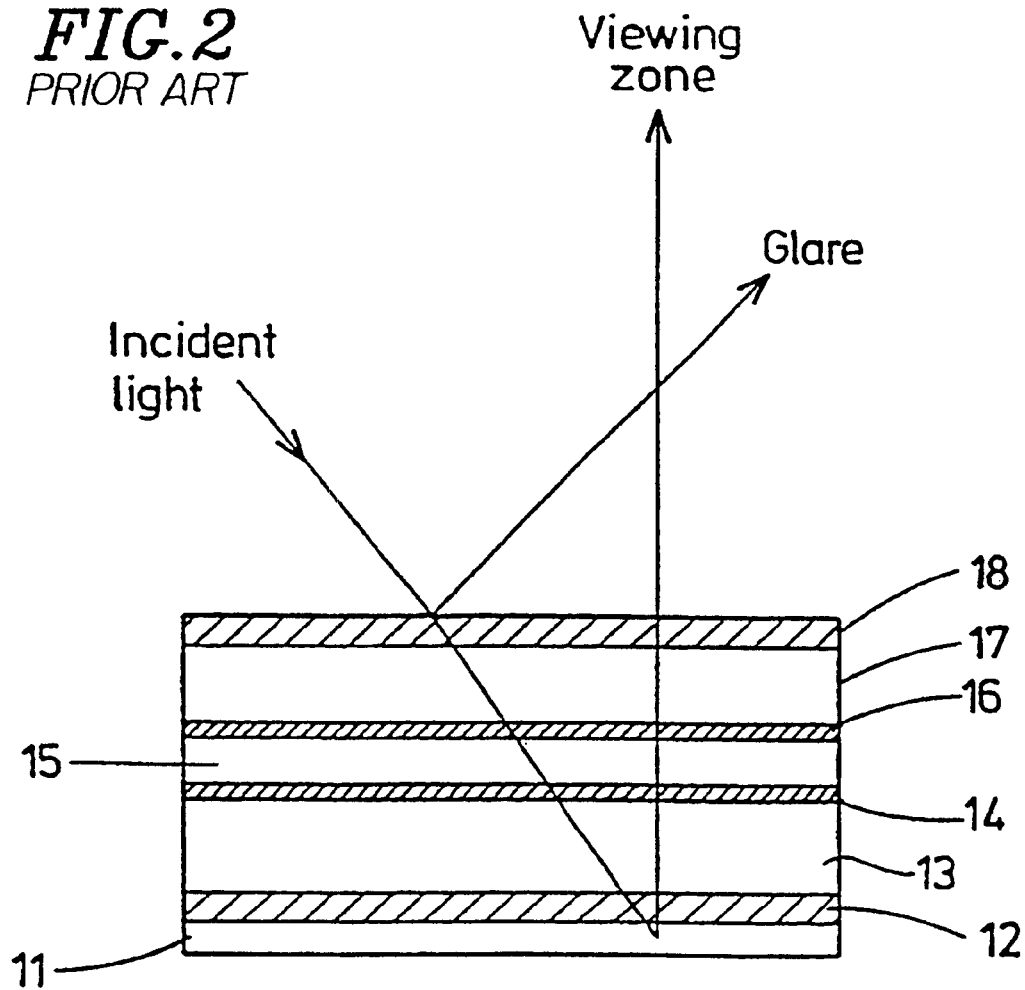

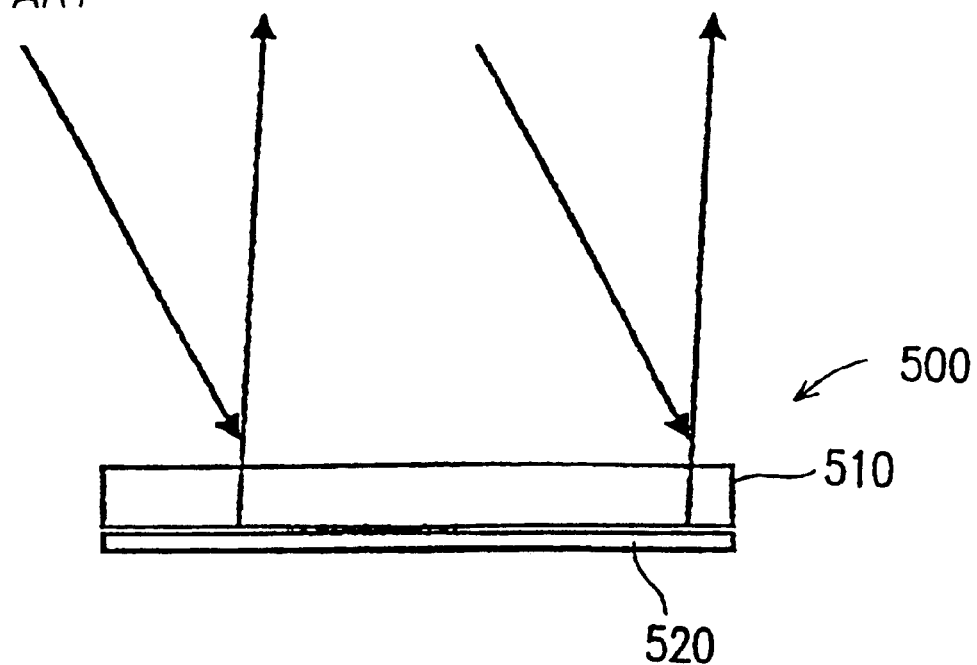

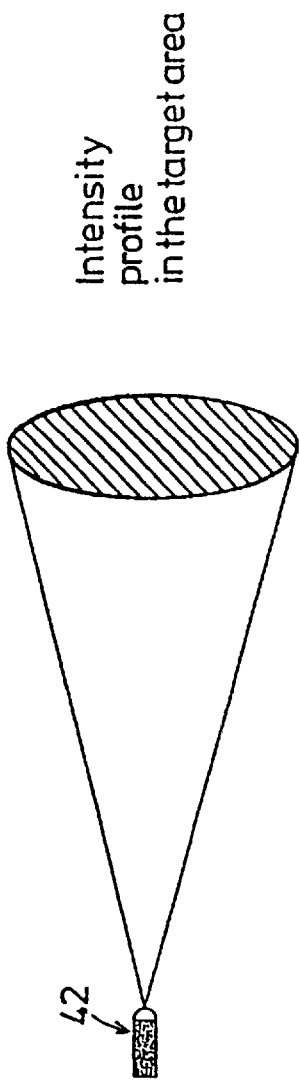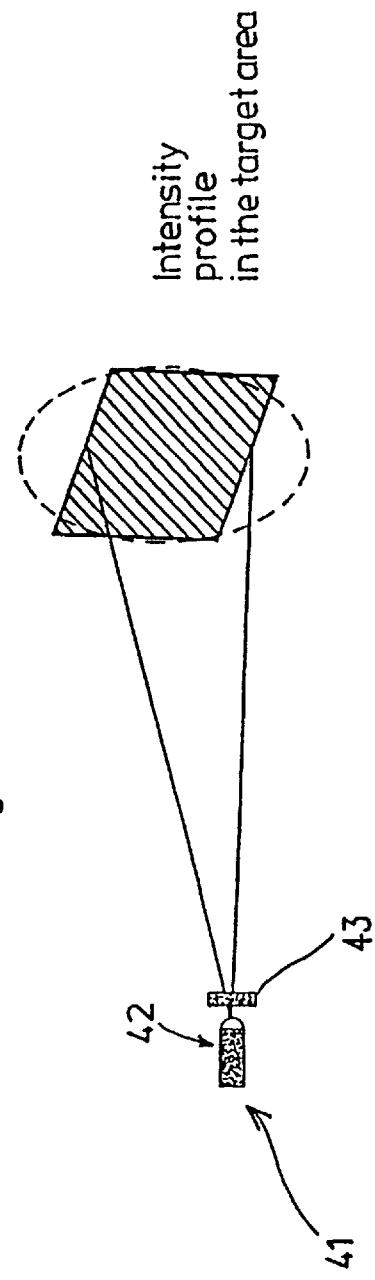
FIG. 6A Without homogenizer
FIG. 6B With homogenizer

Homogeniser + lens

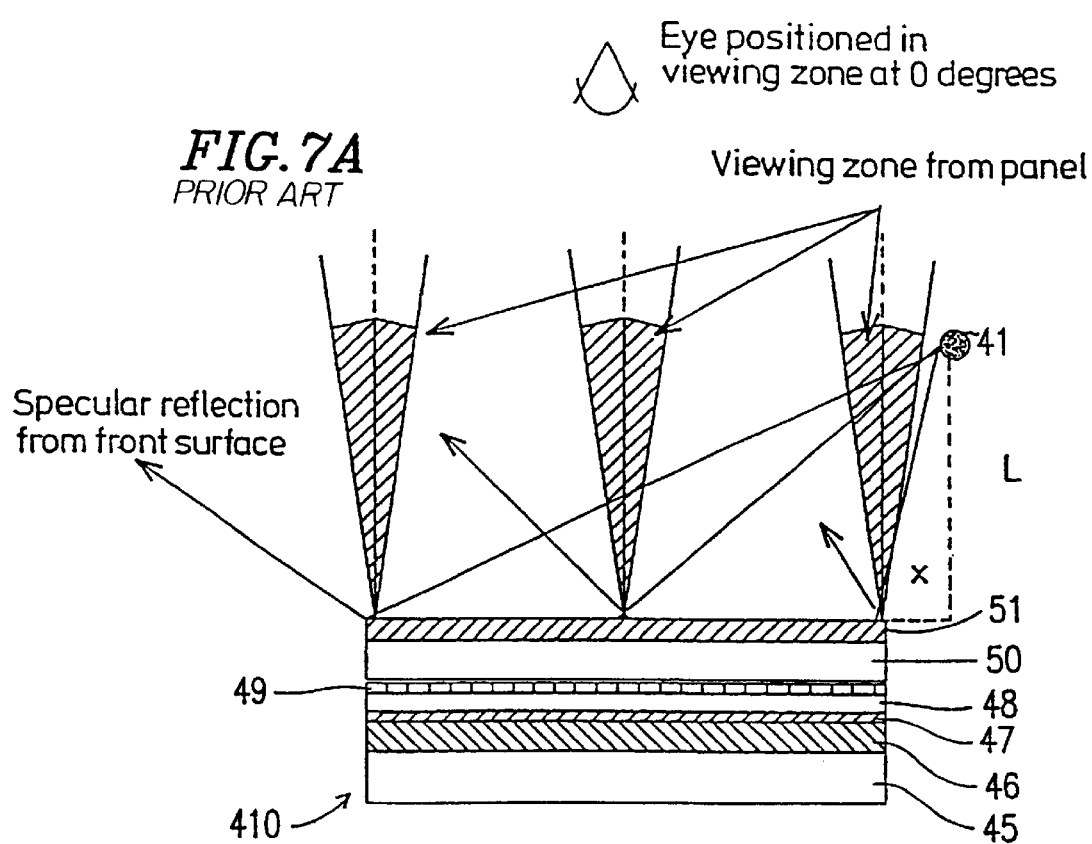

FIG.9C
Position 1
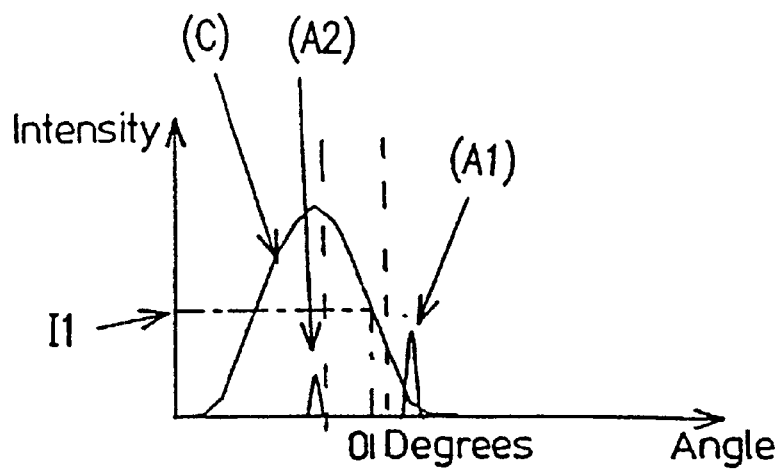
Position 2
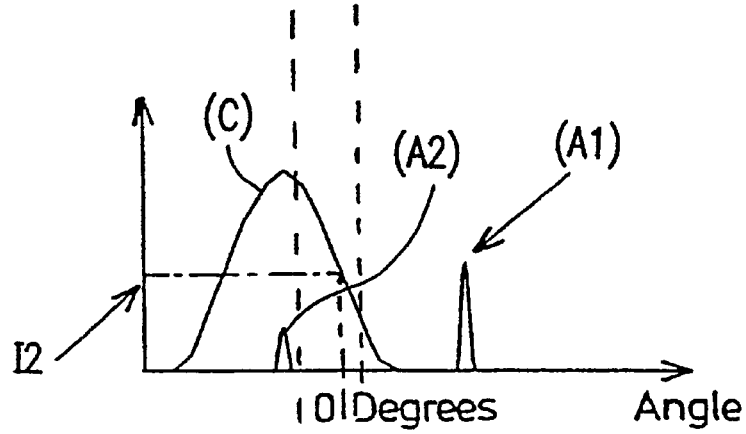
Position 3
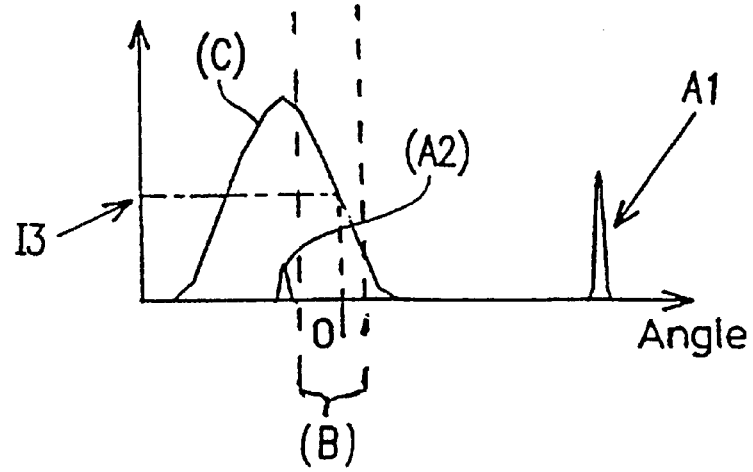

FIG. 9D
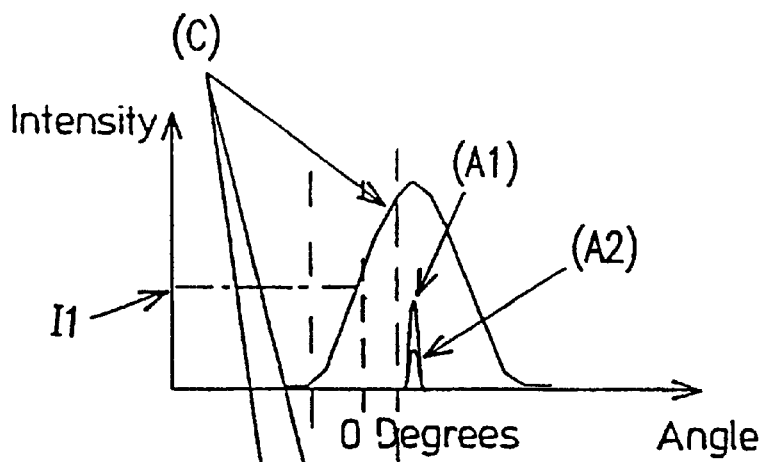
Position 1
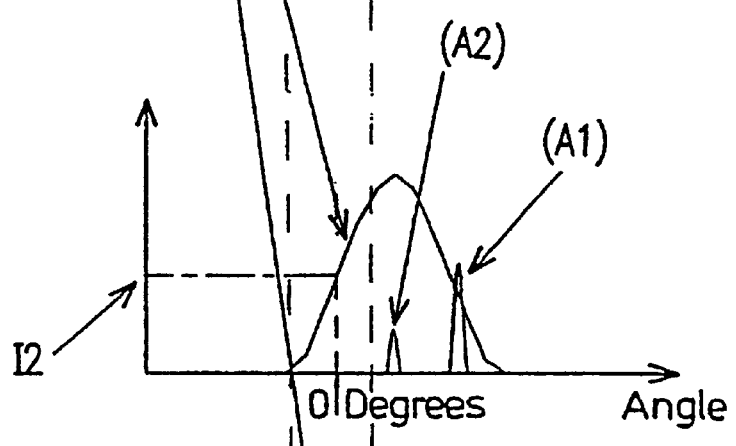
Position 2
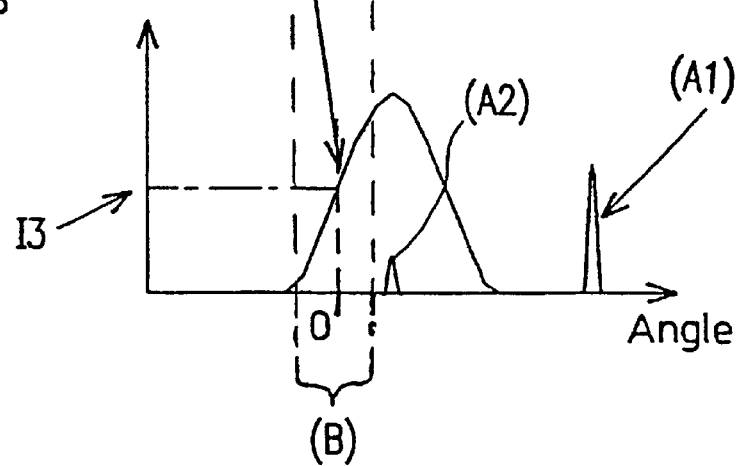
Position 3

Display area

REFLECTIVE DISPLAY DEVICE AND A LIGHT SOURCE FOR A DISPLAY DEVICE

TECHNICAL FIELD

The present application relates to a reflective display device such as a reflective liquid crystal display device (LCD). It particularly relates to a reflective display device having a light source to provide illumination, for example in poor light condition. It also relates to a light source, particularly but not necessarily for use with a display device.

BACKGROUND ART

Reflective LCDs are known in the art. For example, the "super-mobile" high reflectivity LCD produced by Sharp Kabushiki Kaisha essentially comprises a polarizer, waveplates, and a liquid crystal layer disposed in front of a reflective layer. The reflective layer has a metallized non-symmetric surface relief structure, which substantially preserves the polarization of light incident on the reflective layer so as to maximize the contrast of the display. The reflective layer is a "high-gain" reflective diffuser using a non-Lambertian surface relief structure.

Such a reflective LCD can use ambient light, so that the power consumption of the LCD is reduced compared to an LCD that comprises a light source provided behind the liquid crystal layer. This is important for portable display equipment such as a personal digital assistants (PDA), camcorders, portable computing equipment, and digital cameras.

Such a conventional reflective LCD does have a number of disadvantages. Clearly, the display will work poorly in dimly lit environments. Moreover, the color balance of the display will be influenced by the color spectrum of the ambient light. Thus, in sunlight, the display device may work well, but in fluorescent or particularly tungsten lighting, the color balance will be degraded. If the LCD is provided with color filters, these may also affect the color balance of the display.

A further disadvantage is that a high-gain reflective layer will work best when the light incident on the LCD is highly collimated overhead lighting incident on the screen of the LCD at a defined angle. Thus, the display position may have to be fixed by the user of the LCD to obtain the best performance, and this is undesirable. It can thus be seen that it would be advantageous to provide a reflective LCD with an auxiliary light source, to increase the quality of the displayed image and also to allow the LCD to operate in conditions of low ambient light.

As described above, a conventional reflective LCD has a reflective layer that is a high-gain reflective diffuser. If a light source is placed close to the surface of the LCD, a number of effects will be produced. First, the gain of the reflective layer will mean that the observer will see illumination structure across the surface of the LCD. This illumination structure will depend on the profile of illumination by the light source, and on the gain of the reflective layer.

Secondly, some light from the light source will be specularly reflected by the front surface of the LCD and from layers within the LCD. If the light source and a user are positioned such that light from the light source is specularly reflected towards the user, this will reduce the contrast of the display and will also be uncomfortable for the user. In order to prevent the user from seeing the specular reflection of the light source, the light source may have to be displaced laterally, i.e., offset, from the display surface. Displacing the light source in this way does, however, introduces a further problem. The LCD may well provide the highest display contrast for light within well-defined input and output cones. If the light source is displaced as described above, the input light may well no longer lie within the preferred input cone to the LCD and this will reduce the imaging efficiency.

FIGS. 1A and 1B show a prior art reflective LCD. Specifically, FIG. 1A is a cross-sectional view of a prior art reflection LCD device with a holographic element for brightness enhancement in front illumination, and FIG. 1B illustrates the incident and reflective light for the device of FIG. 1A.

The illustrated device is based on a glass substrate 1 on which are disposed, in sequence, a reflective layer (internal mirror) 2, a liquid crystal layer 3, color filters 4, an upper glass substrate 5, a polarizer 6 and a transmission hologram 7. Electrodes to drive the liquid crystal layer 3 are provided on the glass substrates 1 and 5.

The transmission hologram 7 is provided to enhance the brightness of the display. The LCD is illuminated by a distant light source, positioned at 34" offset from the normal axis of the display as shown in FIG. 1B. Light that is specularly reflected from the front surface of the display, or from internal elements of the LCD, is reflected at an angle of 34" to the normal to the display.

The transmission hologram 7 deflects light that is incident upon it. Thus, some of the light that passes through the liquid crystal layer 3 and is reflected by the reflective layer 2 is reflected back towards an observer much closer to the axis of the display than the specularly reflected light. As shown in FIG. 1B, the light from the display is reflected back at an angle of 14" to the normal axis, whereas the specularly reflected light ("glare") is reflected at 34" to the normal axis. The brightness of the LCD is thus increased, since the display light is angularly separated from the glare.

The prior art display shown in FIG. 1A requires to be illuminated with a distant light source that appears collimated at the liquid crystal panel, and it would not function efficiently if the light source were close to the LCD.

U.S. Pat No. 5,663,816 discloses a transmissive LCD in which a reflective holographic directional diffuser is provided at the back side of the LCD. The holographic diffuser is transparent for illumination by a back light, but directionally reflects light when the LCD is illuminated by an external overhead source. The reflection is conical about the axis perpendicular to the reflection side of the LCD.

FIG. 2 shows a further prior art reflective LCD with a holographic light control film. This prior art LCD is disclosed in T. Hotta et al., SPIE Proc., Vol.329, Practical Holography XII, pages 190–195, 1998.

The LCD of FIG. 2 comprises a liquid crystal layer 15 which is disposed between two glass substrates 13, 17 provided with electrode layers 14, 16 for applying voltages to the liquid crystal layer 15. A first polarizer 12 is provided behind the lower glass plate (substrate) 13, and a second polarizer 18 is provided above the upper glass plate (substrate) 17. A volume reflection hologram (holographic light control film) 11 is provided behind the lower polarizer 12, to concentrate reflected light of a-single color into a specific viewing area (the prior art LCD shown in FIG. 2 is a monochromatic LCD).

In the prior art LCD shown In FIG. 2, the holographic film 11 is separated from the liquid crystal layer 15 by the lower glass substrate 13, and this will have a relatively large thickness. The spatial separation of the holographic film 11 and the liquid crystal layer 15 will introduce parallax into the display, and this will reduce the resolution of the LCD.

The prior art device described in U.S. Pat. No. 5,663,816 will also suffer from parallax problems.

U.S. Pat. No. 5,659,508 discloses an LCD viewable under ambient light comprising a liquid crystal panel, and a holographic reflective diffuser positioned behind the liquid crystal layer. The diffuser is made as a transmission hologram, and a light-reflective layer is deposited on the rear of the holographic diffuser. Such a holographic element is cheaper to manufacture as a broad band reflector than the other prior art holographic reflectors described above. However, the prior art device described in U.S. Pat. No. 5,659,508 again requires illumination with collimated light, and is not suitable for use with a closely positioned light source or with a high resolution color panel.

FIGS. 3A and 3B illustrate further prior art reflective LCDs. These are provided with polarization preserving optical diffusion films, so as to improve the performance and viewing angle of the display. Such polarization preserving films are manufactured by Microsharp.

The LCD shown in FIG. 3A comprises a glass substrate 20, a reflective pixel electrode 21, a liquid crystal layer 22, an indium tin oxide (ITO) electrode layer 23, a layer of color filters 24, a glass substrate 25. a Microsharp™ transmission diffuser layer 26, a retardation film 27 and a polarizer 28.

The device shown in FIG. 3B is similar to that in FIG. 3A, but the Microsharp™ diffuser 26 is omitted, and the reflective pixel electrode 21 of FIG. 3A is replaced by a transparent ITO electrode layer 21'. A polarizer 29 is further placed behind the lower glass substrate 20, and a metallized reflective diffuser 30 is placed behind the polarizer 29.

A transmission diffuser 26,30 is a relatively thick (100 $\mu$m) plastic sheet with a random pattern distribution, selectable light diffusion profile, and a skew off-axis performance limited by 10°. The prior art devices illustrated in FIGS. 3A and 3B therefore require illumination with collimated light, and are not appropriate for use with a light source positioned close to the LCD. These devices have, moreover, a further disadvantage, since they produce a diffuse output, so that the contrast of the display will be low.

FIG. 4 illustrates a known projection LCD, which is described in C. Joubert et al., SPIE Proc. Vol.265, pages 243–252, 1996, and in C. Joubert et al., "Applied Optics", Vol.36, No.20, pages 4761–4771, 1997. The configuration of FIG. 4 includes a holographic microlens array for the LCD projection system.

The configuration of FIG. 4 has a full color liquid crystal display 31, which comprises red pixels 31R, green pixels 31G and blue pixels 31B. Light from a light source 32 is focused by a parabolic reflector 33 onto a holographic microlens array 34. Each individual element of the microlens array 34 is a transmission holographic lens which simultaneously disperses white light into RGB light components, and selectively focuses the dispersed RGB light components onto the corresponding color pixels (that is, the red component is focused on to a corresponding red pixel 31R, and so on). The holographic microlens array 34 is acting as both a lens and a diffraction grating.

The holographic microlens array 34 of FIG. 4 requires off-axis illumination by a well-collimated white light source having a divergence of less than 1.9°. Such an element is not suitable for illumination by a diverging light source that is positioned close to the LCD.

FIGS. 5A and 5B illustrate, respectively, a plane view and a top view of a prior art light source for illuminating a bar code. This prior art light source is described in U.S. Pat. No. 5,743,633. It includes a light emitting diode (LED) 35, a light shaping diffuser 36 and a lens 37. The light shaping diffuser 36 is a holographic surface diffuser, which produces a strip-shaped area of uniform illumination.

The illumination system of FIGS. 5A and 5B provides uniform illumination over a target area 38 of a bar code (i.e., a target uniformly illuminated area 38), by homogenizing and concentrating light from the LED 35.

WO 95/12826 discloses a reflective liquid crystal display device 500 as schematically shown in FIG. 5C, which includes a transmissive liquid crystal panel (transmissive SLM) 510 and a reflective holographic element (diffuser) 520 disposed behind the liquid crystal panel 510. When diffuse light or substantially collimated light is incident on the LCD 500, the holographic element 520 transforms the off-axis collimated beam into a collimated beam that is propagating substantially on-axis. Each point of the holographic element 520 of the LCD 500 of WO95/12826 has the same Bragg angle.

WO97/34174 and WO96/37805 both disclose a reflective display device provided with a holographic element. In both cases, the holographic element functions as a diffuser, and is intended to provide even illumination of the display and to increase the brightness of the display. These prior art documents are directed to eliminating the need to provide an auxiliary light source.

U.S. Pat. No. 5,594,560 discloses a reflective display device that is provided with a reflective holographic optical element. The holographic element is provided to enhance the brightness of the display, and the device incorporates a fluorescent layer in order to increase the spectral band of the hologram.

G. T. Valliath et al., "Design of Hologram for Brightness Enhancements in Color LCDs", SID DIGEST 98, pages 1138–1142 discloses a reflective display device comprising a transmissive holographic diffuser diffused in front of a reflective spatial light modulator. In use, the device is again illuminated with an off-axis beam of collimated light, and the holographic diffuser transforms this into a collimated beam propagating substantially on-axis. Each point of the holographic diffuser has the same Bragg angle.

DISCLOSURE OF THE INVENTION

The present invention provides a display device comprising: a spatial light modulator having an optical modulation layer; and a reflector disposed behind the optically modulating layer, and further comprising a holographic field lens.

A holographic field lens is a holographic optical element disposed substantially in the image plane of the display device, and which has optical power and re-direction properties Thus, a holographic field lens can convert an incident beam of diverging light to a beam of collimated light, and can also re-direct the incident light. Whereas the hologram layer 7 in the prior art device of FIG. 1A simply deflects the incident light, and so requires an incident beam of collimated light, the holographic field lens of the present invention simultaneously concentrates incident light and redirects it in a preferred direction, and may be used with a close, offset light source.

The present invention will function when the display device is illuminated with diverging light, as will be the case when it is illuminated by a nearby light source, but this will not be the case for the prior art device of FIG. 1A.

The reflector may be disposed within the spatial light modulator. This prevents problems from arising owing to parallax.

The reflector may be a non-Lambertian reflector. This increases the intensity of light reflected by the reflector.

The holographic field lens may collimate off-axis diverging light incident on the holographic field element. In this case, the display device functions as if it was illuminated with a virtual source of collimated light.

The collimated light may be directed at an angle θ to the normal axis to the display, wherein θ is greater than half the acceptance angle of the holographic field lens. This prevents light reflected back to the holographic field lens from interacting with the holographic field lens. The angle θ may be θ≧30°.

The holographic field lens may be a holographic microlens array. The display device may further comprise color filters, wherein the pitch of the holographic microlens array is substantially three times the pitch of the color filters. When such a device is illuminated with white light, the white light is split, with red light being directed to a red color filter, green light to a green color filter, and blue light to a blue color filter, respectively. Since the pitch of the microlens array is three times the pitch of the color filters, manufacturing tolerances for the microlens array are eased.

The holographic field lens may be disposed in front of the optical modulation layer. Alternatively, the holographic field lens and the reflector may be formed in a single element.

The holographic field lens may be disposed within the spatial light modulator, and the holographic field lens may be positioned close to the optical modulation layer. This reduces the loss of contrast that would be caused by hologram scatter. The holographic field lens may be separated from the optical modulation layer, to prevent holographic materials from contaminating the liquid crystal layer.

The display device may further comprise a light source, wherein the light source is arranged to illuminate the spatial light modulator with diverging light. This enables the display device to be operated in low ambient light.

The light source may be offset with respect to the spatial light modulator, so that specularly reflected light is not reflected towards a user.

The display device may further comprise a homogenizer disposed between the light source and the spatial light modulator. The homogenizer will shape the profile of the light beam from the light source to correspond with the shape of the spatial light modulator. It will also make the intensity uniform over the beam and thus over the display device. The homogenizer may be a holographic homogenizer. It may be a reflective holographic homogenizer, such as a reflective volume holographic homogenizer.

The light source may be substantially monochromatic, or it may be a white light source. Alternatively, the light source may comprise at least a first light source emitting light at a first wavelength and a second light source emitting light at a second wavelength. This allows the color balance of light from the light source to be adjusted, for example to suit the color filters used in a full color display device.

The light source may be a light emitting diode. Alternatively, the first light source may comprise a first light emitting diode for emitting light of the first wavelength, and the second light source may comprise a second light emitting diode for emitting light of the second wavelength. A light emitting diode is a low power device, and so is advantageous for use in a portable, battery powered display device.

The diffraction efficiency of the holographic field lens may vary over the holographic field lens. The diffraction efficiency of the holographic field lens may be lower at a side of the spatial light modulator near the light source and higher at a side of the spatial light modulator away from the light source. This improves the uniformity of the intensity of the display.

The holographic field lens may be chromatic, and the first and second light sources may be disposed at the respective foci of the holographic field lens for the light of the first wavelength and the light of the second wavelength, respectively.

The display device may further comprise a cover member, wherein the light source is disposed on the cover member. This is a simple way to provide a display device with a light source for use in low ambient light. Alternatively, the display device may further comprise a support member for supporting the light source, and the support member may be movable between a stowed position and a position in which the light source is able to illuminate the spatial light modulator.

The optical modulation layer may be a liquid crystal layer.

A second aspect of the present invention provides an illumination system comprising at least one light source, and a holographic homogenizer disposed in the path of light from the light source(s).

The holographic homogenizer may be a reflective holographic homogenizer.

The holographic homogenizer may alternatively be a transmissive holographic homogenizer. The illumination system may further comprise a reflector, wherein the transmissive holographic homogenizer is disposed between the at least one light source and the reflector.

The illumination system may comprise first, second and third light sources for emitting light at a first wavelength, a second wavelength and a third wavelength, respectively, wherein the first, second and third light sources are disposed in a linear array. The linear array of light sources is disposed at an achromatic angle to the holographic homogenizer.

The illumination system may comprise first, second and third light sources for emitting light of a first wavelength, a second wavelength and a third wavelength, respectively, wherein the light sources are arranged in a substantially triangular configuration.

Each of the at least one light source may be a light emitting diode.

BRIEF DESCRIPTION OF DRAWINGS

Preferred embodiments of the invention will now be described by way of illustrative examples, with reference to the accompanying examples, with reference to the accompanying figures in which:

FIG. 2 is a cross-sectional view of a prior art LCD incorporating a reflective holographic film;

FIG. 5C is a schematic illustration of the reflective display device of WO95/12826 which incorporates a reflective holographic element:

FIGS. 6A and 6B are schematic illustrations of the effect of an homogenizer on the illumination provided by an LED:

FIG. 7A is a schematic illustration of a prior art reflective LCD, and shows the problems associated with illumination by a closely positioned front light source;

FIG. 9C show the angular distribution of intensity of reflected light from three separate areas of the LCD of FIG. 9A;

FIG. 9D shows the angular distribution of intensity of reflected light from three separate areas of the LCD of FIG. 9B:

BEST MODE FOR CARRYING OUT THE INVENTION

Figure 9A:
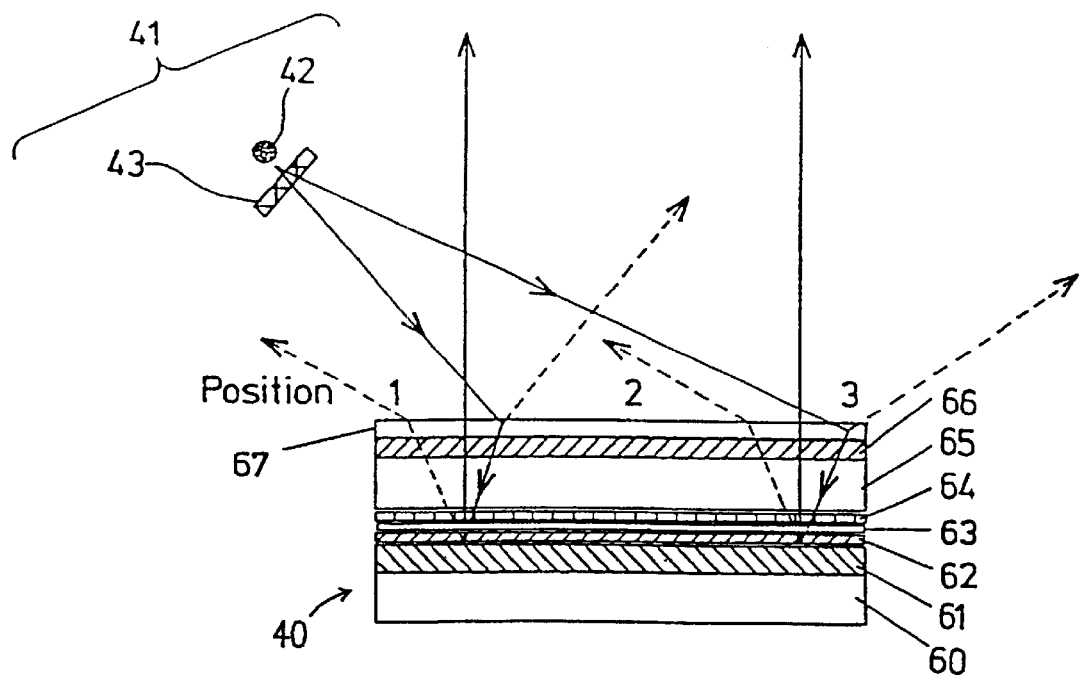
FIG. 9A is a cross-section of a reflective LCD according to a first embodiment of the present invention.

FIG. 9A illustrates a cross-sectional view of one embodiment of the proposed front illumination system for a reflective LCD according to the invention with reversed holographic illumination of a panel. Specifically, a reflective LCD 40 according to a first embodiment of the present invention is illustrated in FIG. 9A.

The LCD 40 is provided with an auxiliary light source 41, for use in conditions of low ambient light. The light source 41 is placed above the LCD 40 and is offset from the LCD 40. The light source 41 is disposed close to the LCD 40.

In the embodiment of FIG. 9A, the auxiliary light source 41 comprises a light emitting diode (LED) 42. An LED 42 has a low power consumption, and this makes an LED 42 suitable for use in a battery powered, portable equipment. In the embodiment of FIG. 9A, the light source 41 is further provided with a beam shaping homogenizer 43, or beam shaping diffuser, to redirect and shape the light emitted by the LED 42 to obtain a uniform, bright illumination of the display device 40.

The action (optical function) of the homogenizer 43 for LED illumination is illustrated in FIGS. 6A to 6D.

As illustrated in FIG. 6A, an LED 42 emits light having a generally circular or elliptical beam profile (intensity profile). This beam profile is undesirable, however, since most display equipment has a rectangular display screen. If a rectangular display screen as a target area is illuminated with a circular beam (i.e., a beam with a circular intensity profile) as in FIG. 6A, either some areas of the display screen will not be illuminated, or some light in the beam will fall outside the active area of the display screen and will be wasted. A further problem is that the intensity profile across the beam is non-uniform, and this will lead to a non-uniform illumination of the display screen.

Figure 5A:
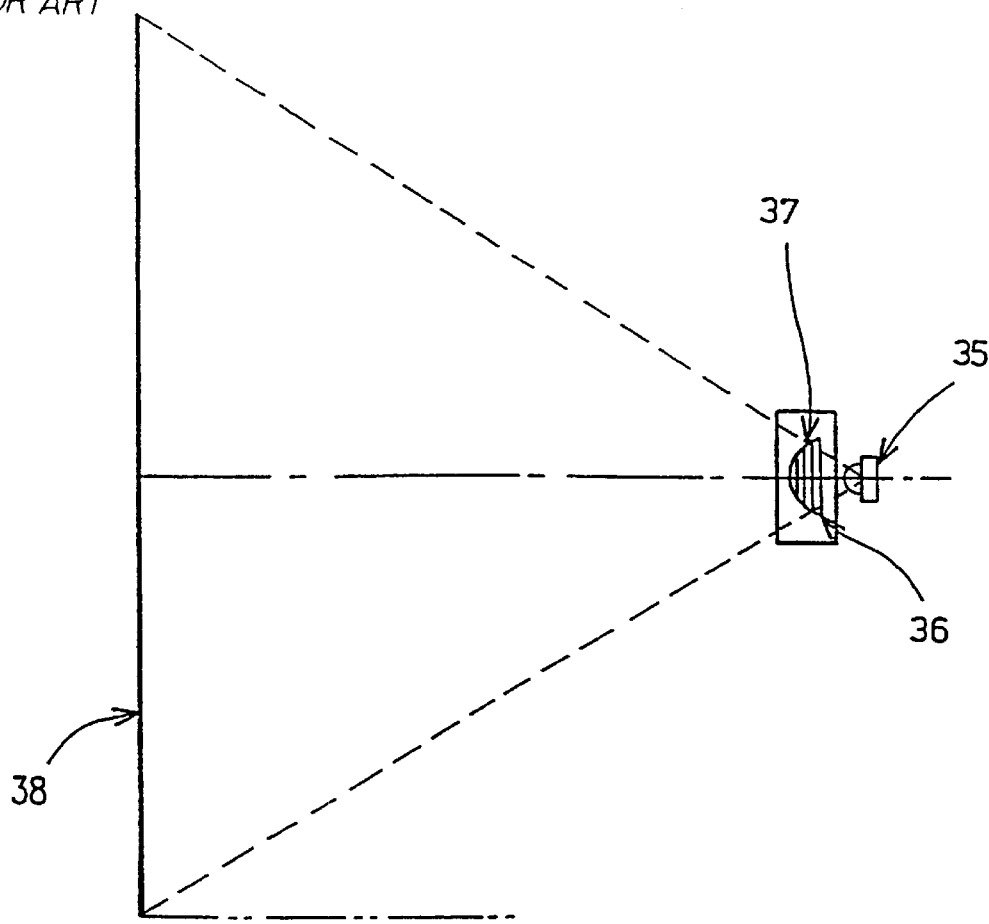
FIGS. 5A and 5B are illustrations of a prior art illumination system for illuminating a bar code.
Figure 5B:
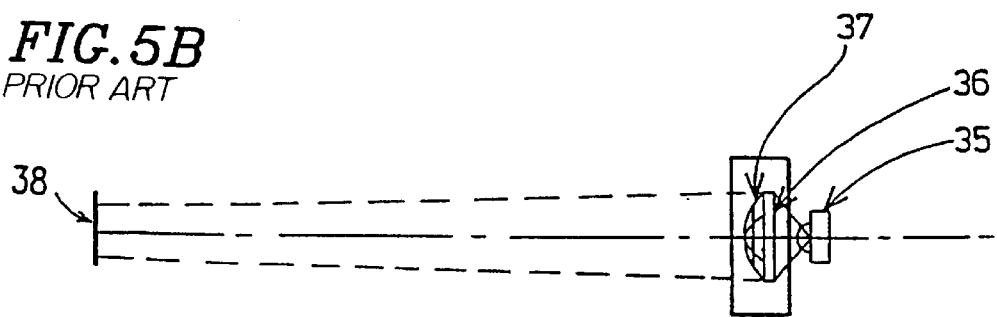
Figure 6C:
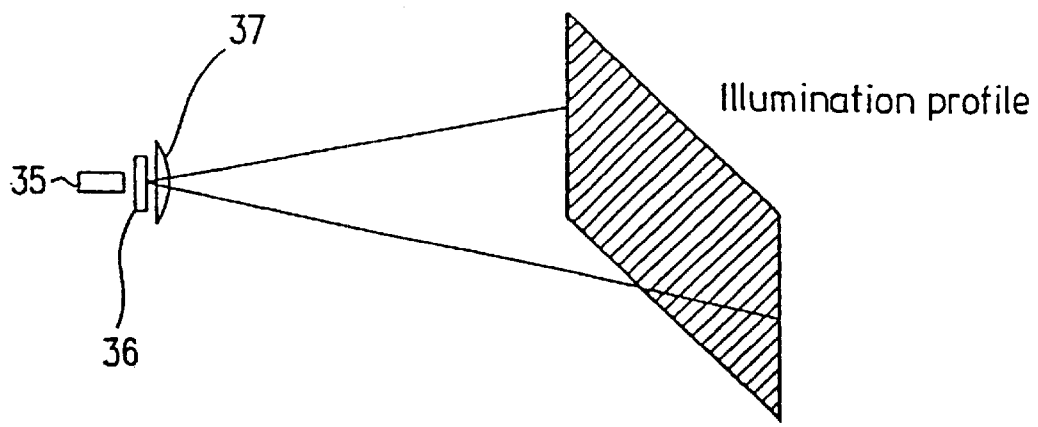
FIG. 6C is a schematic illustration of the illumination provided by the prior art illumination system of FIGS. 5A and 5B.

To overcome these problems, the light source 41 is provided with the beam homogenizer 43 to reshape the beam of light emitted by the LED 42. As shown in FIG. 6B, the beam homogenizer 43 converts the circular beam profile to a rectangular beam profile (intensity profile), and this is suitable for illuminating a rectangular display screen (target area). The beam homogenizer 43 also homogenizes the intensity of the light across the beam, so that the intensity across the display is substantially uniform Compared to the prior art system of FIG. 6C (which corresponds to FIG. 5A), the present invention does not require the lens 37 of the prior art.

The transmission homogenizer 43 may be of a holographic type including a transmission type hologram, or may be of a non-holographic type including refractive lens arrays.

Figure 6D:
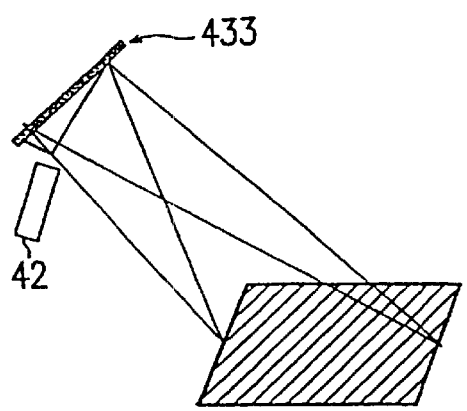
FIG. 6D is a schematic illustration of a reflective beam shaping homogenizer for an LED illumination system.

Specifically, the hologram homogenizer 43 may be a transmission hologram as shown in FIG. 6B, a mirror-backed transmission hologram for reflection operation, or a reflection volume hologram homogenizer 433 as shown in FIG. 6D. The output of the hologram 433 is recorded such that an area having the size of the LCD active areas is illuminated. The reflection holographic element as the reflection hologram homogenizer 433 may be a transmission hologram backed by a mirror, a metallized embossed structure, or a volume reflection hologram.

The hologram homogenizer 43 is positioned close to the output face of the LED 42 such that its size with respect to the LCD 40 is minimized. Thus, an element at the surface of the LCD 40 sees a light source 41 having a small size, and the hologram can be optimized for a single source at a specific position.

As an example, an LED 42 may have an emitting aperture of around 3 mm placed at a distance of 50 mm above the surface of a 4" LCD panel. If the brightness of the LED 42 is 6 Cd (which has been reported for blue LEDs) and if the output cone solid angle of the LED 42 illuminating the LCD 40 is of the order of 0.013 sterad, then the LED 40 is producing 2 lumen of optical power. A 4" PDA display has a total area of around $5 \times 10^{-3}$ m$^2$. For a full color light source comprising red, green and blue LEDs then, if the display has a Lambertian output ($2\pi$ steradian), this gives a final display luminance of 9 Cdm$^2$, assuming that the red and green LEDs have the same brightness as the blue LED. For illumination with broad band white light, polarizers and color filter losses combined with non-Lambertian diffusers might be expected to give system losses of around 70%, so giving an output brightness of the order of 3 Cdm$^{-2}$. In practice, LEDs have a sufficiently narrow band output wavelength so that it is possible to obtain significantly lower losses by tuning the wavelengths to the absorption profiles of the color filters of the LCD. As brighter LEDs are developed, it will be possible to obtain a greater output brightness than this value of 3 Cdm$^{-2}$. Moreover, an array of LEDs can be used to increase the output brightness.

In order to effectively illuminate the LCD 40, the auxiliary light source 41 should be positioned so as not to obscure the visibility of the display 40 to an observer. This means that It will generally be offset to one side of the display 40.

A further, and more important, consideration is the effect of specular reflections from the LCD panel 40. These will be due to Fresnel reflections from the front glass screen of the panel, and also due to reflections within the LCD 40 from the layers making up the LCD 40.

The effect of the position of the auxiliary light source 41 on frontal reflections is illustrated in FIG. 7A. In order to maximize the performance of the display 410, the specular reflections of the light source 41 must not coincide with the viewing zone of the panel 410 (as shown in FIG. 7A, the viewing zone extends around the normal axis to the display panel 410).

Specifically, FIG. 7A schematically describes problems associated with a closely positioned light source 41 in a reflective display 410. The light source 41 is offset so that an observer does not see specular reflection from a front surface of the panel 410 and the layers within the panel 410 (e.g., from the ITO electrode layer 48) within the viewing cone. This problem is associated with all displays with closely positioned light sources.

The LCD 410 shown in FIG. 7A comprises a glass substrate 45, which is provided with electrodes. On the glass substrate 45 are disposed a reflective layer (internal mirror) 46, a liquid crystal layer 47, an ITO electrode layer 48, color filters 49, a glass substrate 50 and a polarizer 51.

FIG. 7A shows that the angle of the specular reflections will be closest to the viewing zone at the edge of the panel 410 closest to the light source 41.

Figure 7B:
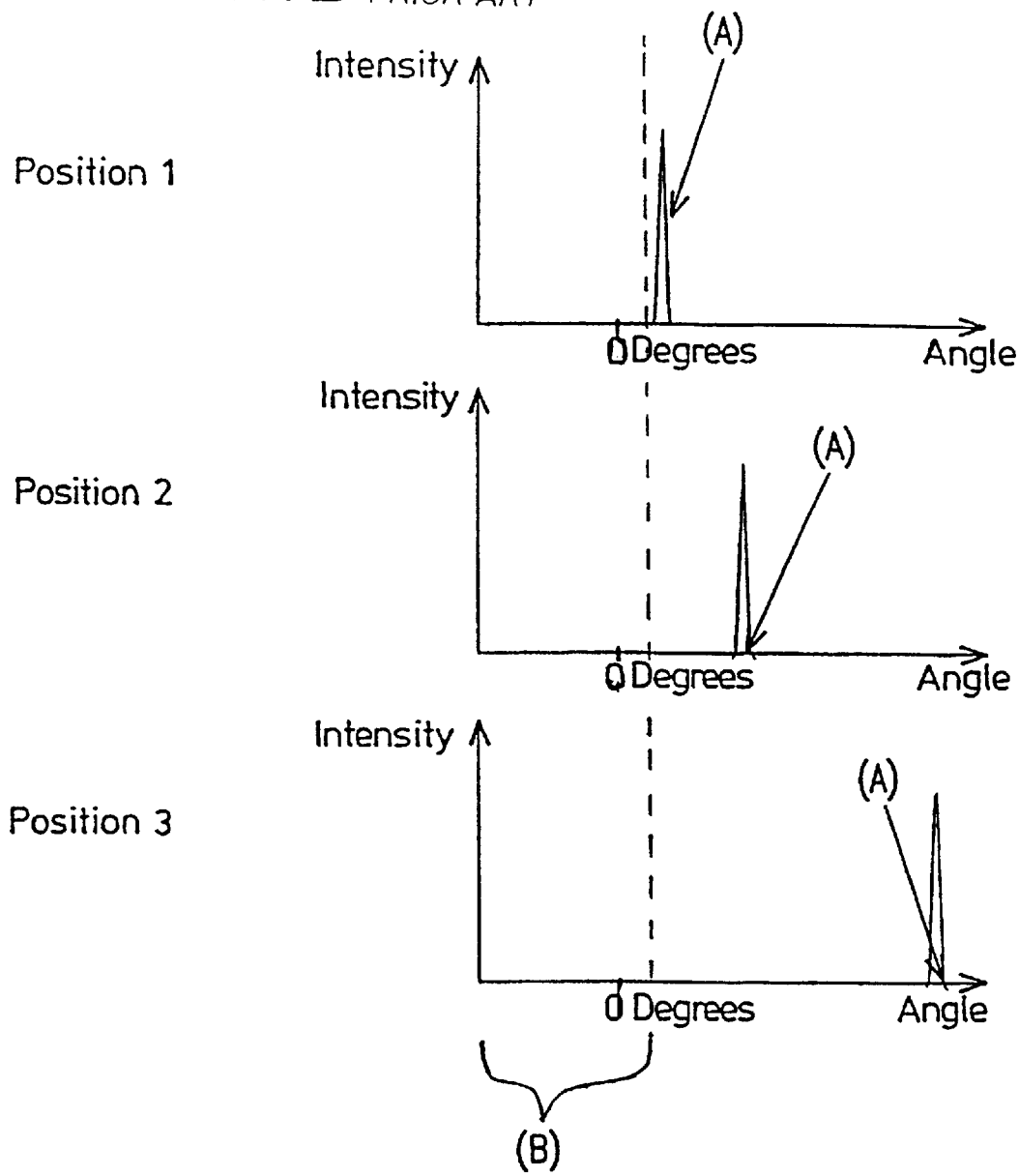
FIG. 7B shows the angular distribution of intensity of reflected light from three different areas of the LCD of FIG. 7A.

FIG. 7B illustrates variations of a reflected light from a typical specular reflection at different illumination angles. In other words, FIG. 7B shows the angular position of the specular reflection from the front of the LCD panel for three positions across the surface of the panel, with position 1 being closest to the light source 41 and position 3 being furthest from the light source.

The specular reflection has a defined angular size, i.e., distribution of intensity exists around the specular reflection, as indicated with (A) in FIG. 7B, as a result of the finite size of the light source. The useful range of viewing angles (that is, the useful viewing zone or the useful angular freedom of display) is also shown as (B) in FIG. 7B.

As seen from FIG. 7B, an observer positioned orthogonal to the panel will not see the specular reflection from anywhere on the panel for an offset light source.

The offset position of the auxiliary light source is determined by the requirement to separate the specular reflection from the displayed image at the intended viewing angle. The minimum offset required can be estimated as:

$$x = L \tan \theta$$

where x is the horizontal distance between a projection of the light source and the closest edge of the panel, L is the vertical distance between the light source and the LCD, and θ is the required viewing angle measured from the normal axis of the LCD panel.

In general, the light source will be positioned vertically with respect to the panel so that the specular reflections are directed towards the observer's chest or over their head. Thus, the auxiliary light source in general will simulate an overhead light.

Figure 8A:
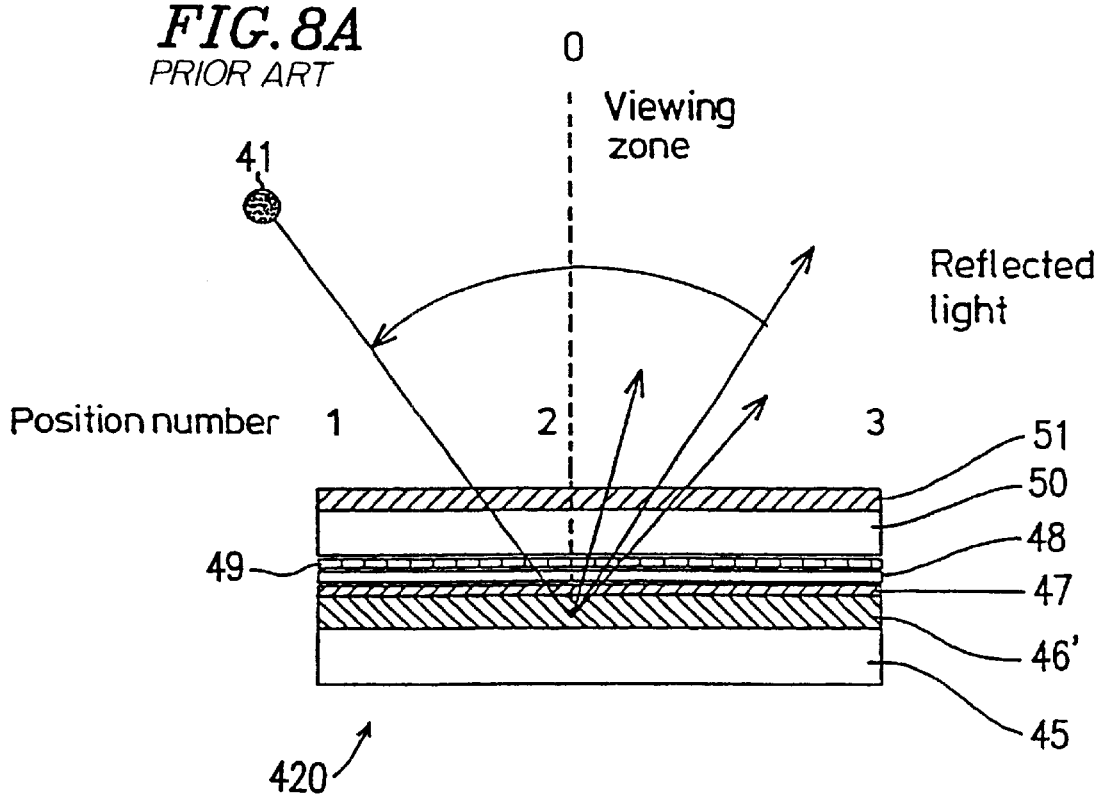
FIG. 8A is a cross-section of a prior art LCD incorporating a high gain reflective layer.

FIG. 8A is a schematic sectional view of a known reflective LCD 420. This is similar to the LCD 410 shown in FIG. 7A, but with a high gain reflective layer (internal mirror) 46' functioning as a "gain>1" diffuser. The other elements in FIG. 8A are the same as the corresponding ones in FIG. 7A. They have the same reference numerals, and the descriptions therefor are omitted here.

The high gain reflective layer 46' will distribute the reflected light in a cone around the direction of the specular reflection, as illustrated schematically in FIG. 8A. This helps to improve the apparent brightness of the display 420 in its ambient illumination mode by efficiently using light from an ambient overhead light source, while still maintaining some degree of uniformity of illumination across the panel 420 and increasing viewing freedom while removing direct visibility of the ambient overhead light source.

A prior art LCD 420 as shown in FIG. 8A is, however, unsatisfactory if an auxiliary light source 41 is provided close to the LCD 420. This is explained with regard to FIG. 8B.

Figure 8B:
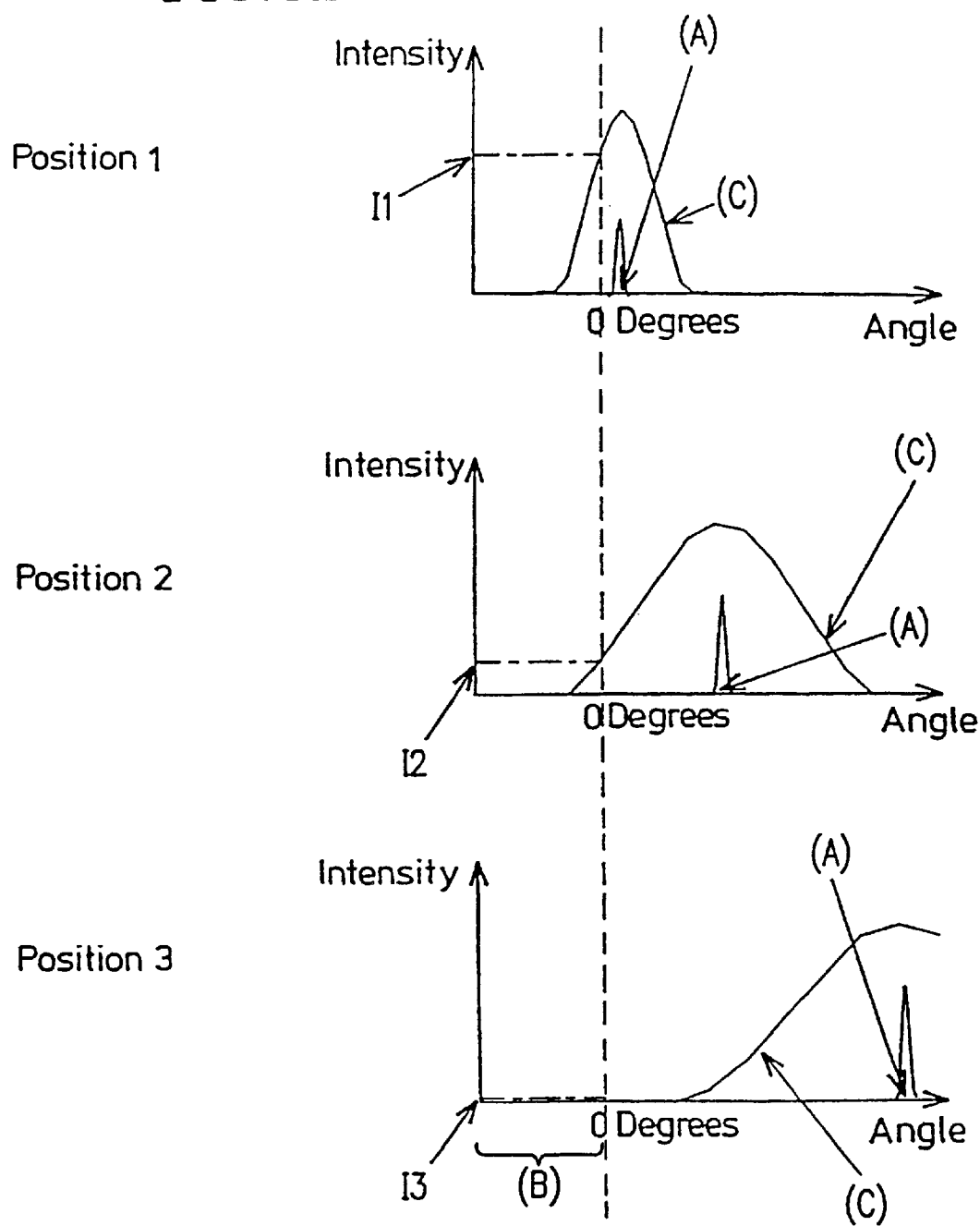
FIG. 8B illustrates the angular distribution of intensity of reflected light from three separate areas of the of FIG. 8A.

FIG. 8B illustrates variations of a reflected light from a typical high gain diffuser at different illumination angles. In other words, FIG. 8B shows the angular distribution of reflected light for the case of a closely positioned offset light source. The position of the specular reflection is illustrated for three positions across the panel, with position 1 being closest to the light source and position 3 being furthest from the light source. FIG. 8B also shows the intensity distribution of light after reflection from a high gain internal reflector. In FIG. 8B, the specular reflection (i.e., distribution of intensity due to the specular reflection of finite size light source) is indicated with (A), while distribution of intensity around the specular reflection due to a high gain diffuser is indicated with (C), for each of the diagrams in FIG. 8B for positions 1, 2, and 3.

The useful range of viewing angles is also shown as (B) in FIG. 8B. In addition, the respective intensities seen at positions 1, 2, and 3 by an observer at 0 degrees with respect to the panel are indicated with I1. I2, and I3, respectively. It should be noted that an observer positioned orthogonal to the panel will see the three intensities I1, I2, and I3 marked by the 0 degree line at each of the positions across the display. Moreover, it will be seen that the intensities I1, I2, and I3 seen by an observer viewing the LCD along the normal axis varies considerably from position 1 to position 2, and from position 2 to position 3. This is because the LCD of FIG. 8A is intended for use with a distant light source, which provides a beam of collimated light at the panel.

As described above, in displays with a closely positioned light source and a reflector (e.g., a "gain>1" reflector), the reflector will distribute the reflected light in a cone around the direction of the specular reflection. Therefore, an observer in the required viewing position to avoid the specular reflection will thus see an intensity variation across the display.

Figure 1A:
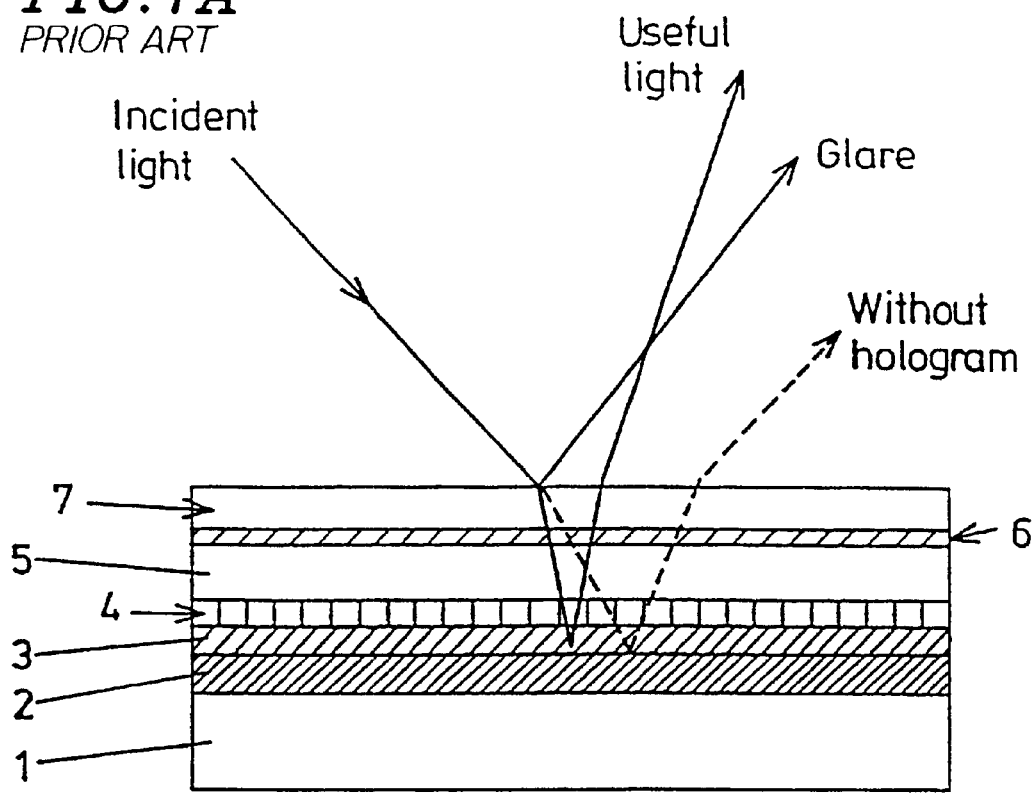
FIG. 1A is a cross-sectional view of a prior art reflective LDC incorporating a holographic layer.
Figure 1B:
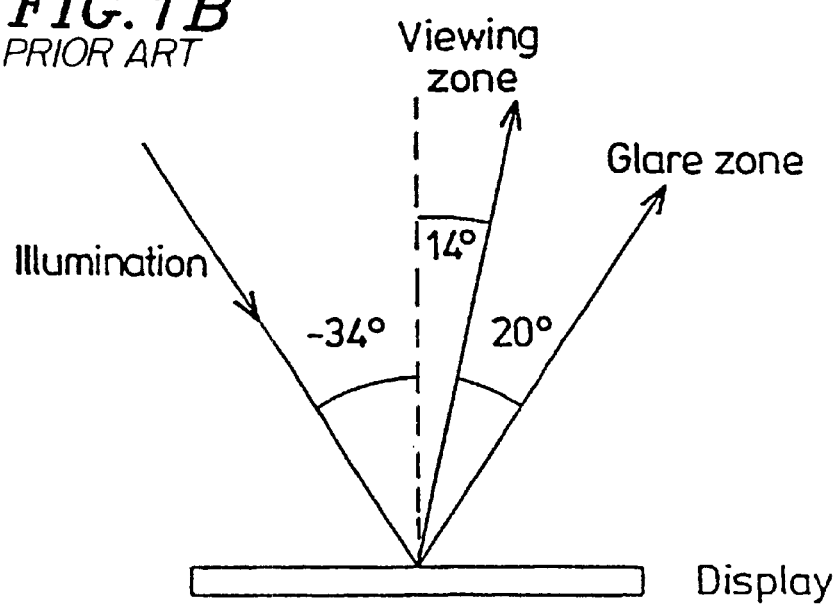
FIG. 1B illustrates the incident and reflective light for the device of FIG. 1A.
Figure 3A:
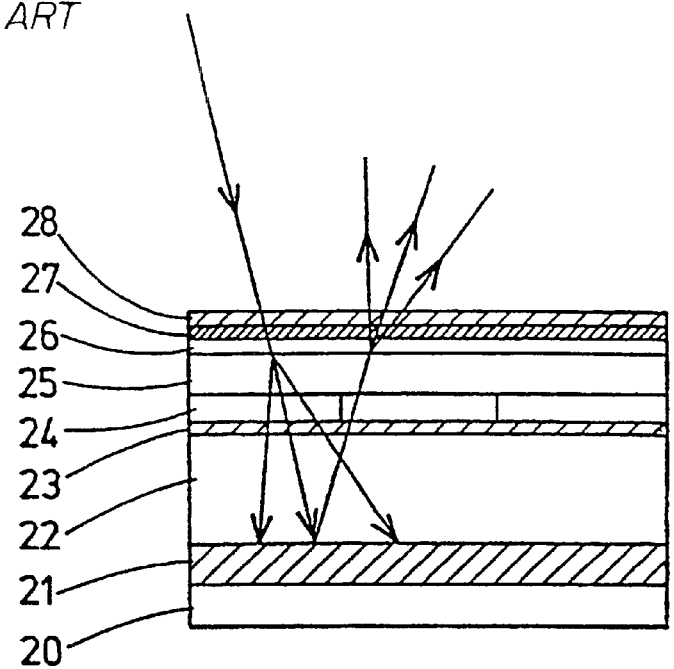
FIG. 3A is a cross-sectional view of a prior art LCD employing a light diffusing film.
Figure 3B:
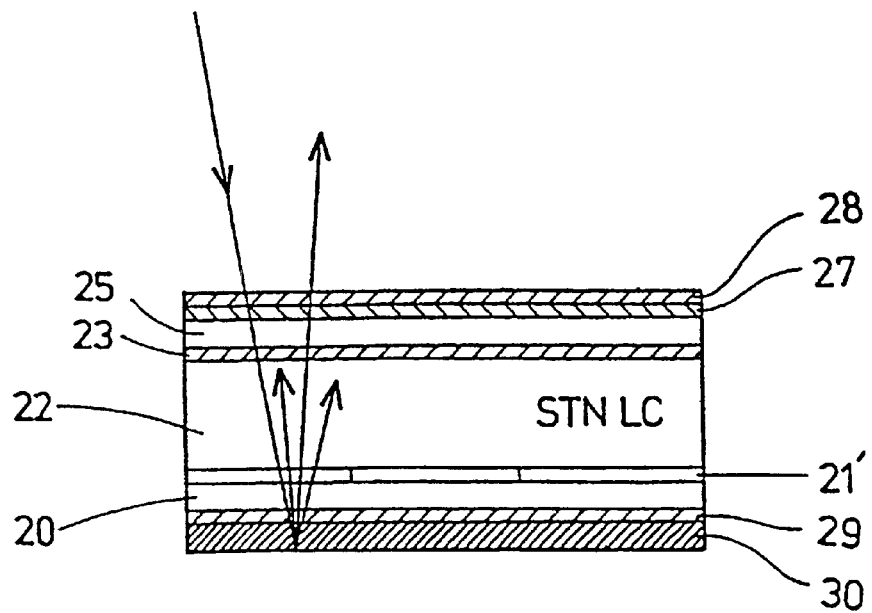
FIG. 3B is a cross-sectional view of a prior art LCD incorporating a reflective diffusing layer.
Figure 4:
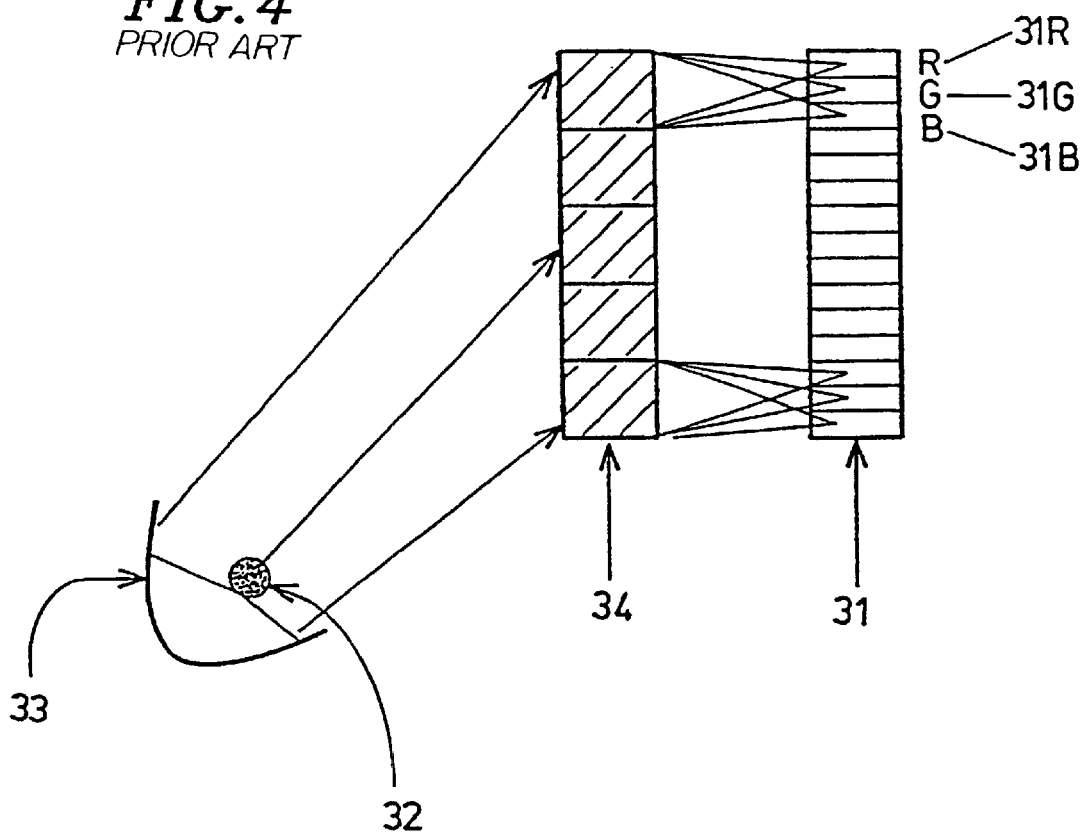
FIG. 4 is a schematic view of a prior art LCD projection system incorporating a holographic microlens array.

If the prior art LCD shown in FIG. 1A were used with a closely positioned light source, It would suffer from the disadvantages described with reference to. FIG. 8B. This prior art LCD has a holographic element with a constant Bragg diffraction angle across its surface, so that it will direct collimated light incident on it in a particular direction, regardless of which part of its surface the light is incident on. If, however, the prior art LCD is illuminated by diverging light from a close, offset auxiliary light source, the incidence angle of the light will vary across the panel. Certain areas of the panel would not satisfy the Bragg condition and so would not process the incident light.

FIGS. 10A to 10H illustrate possible arrangement for providing an LCD display 40, such as a PDA, with an auxiliary light source 41 for conditions of low ambient light (i.e., possible appearances of a proposed front illumination system for a reflective LCD according to the inention).

Figure 10A:
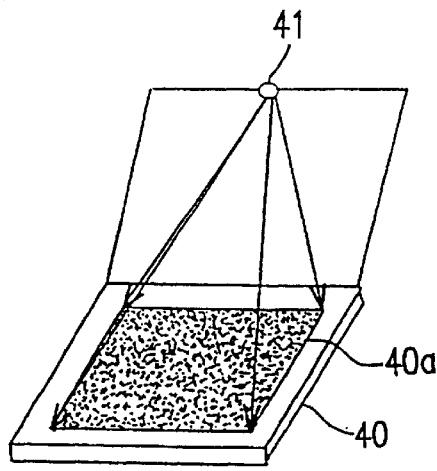
FIGS. 10A to 10H illustrate possible arrangements of a front illumination system for a reflective LCD.
Figure 10B:
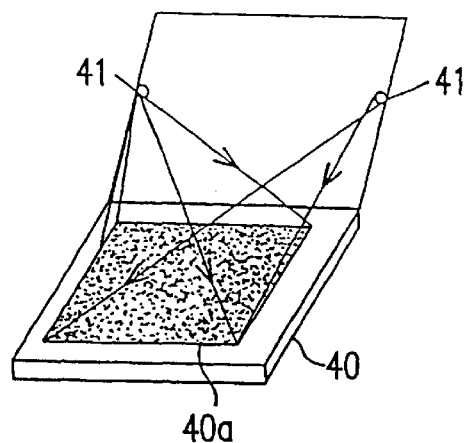

In FIG. 10A, the auxiliary light source 41 (e.g., an LED with a light shaping homogenizer) is attached to the cover of the LCD 40, in a central position, and a target area 40a of the LCD 40 is irradiated with the light source 41. FIG. 10B is similar, but two auxiliary light sources 41 are used, one attached to each side of the cover of the LCD 40.

Figure 10C:
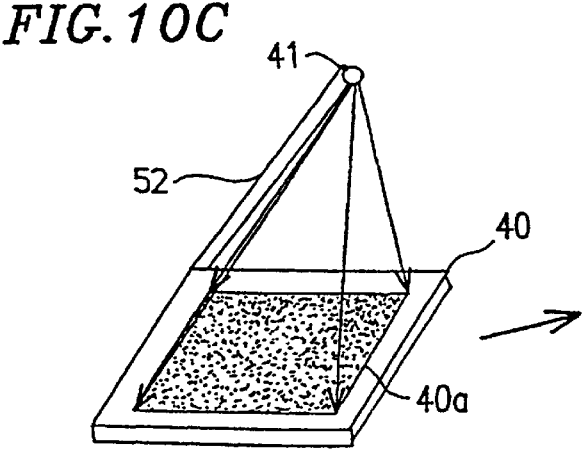
Figure 10D:
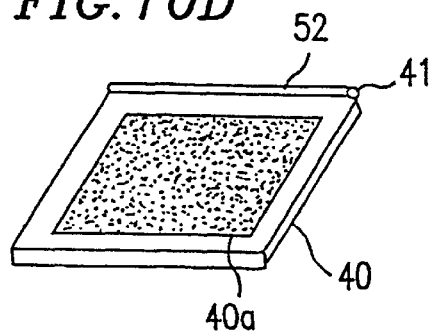

In FIG. 10C, the auxiliary light source 41 is attached to a moveable arm 52 of the LCD 40, and a target area 40a of the LCD 40 is irradiated with the light source 41. The arm 52 can be folded out of the way when the intensity of the ambient light is sufficient to operate the LCD 40 so that the auxiliary light source 41 is not required (see FIG. 10D).

Figure 10E:
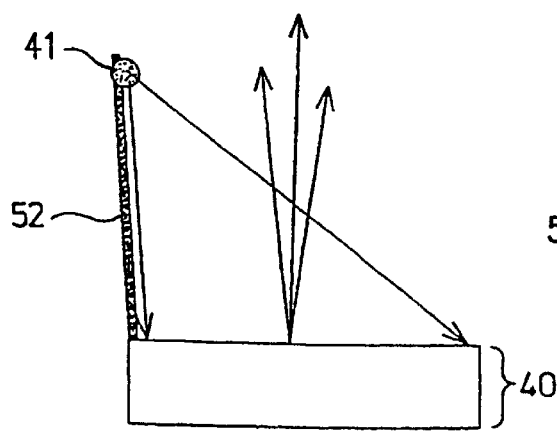

FIG. 10E is a sectional view of the LCD 40 showing the auxiliary light source 41, which in this embodiment includes an LED and an homogenizing element (not shown), in use.

Figure 10F:
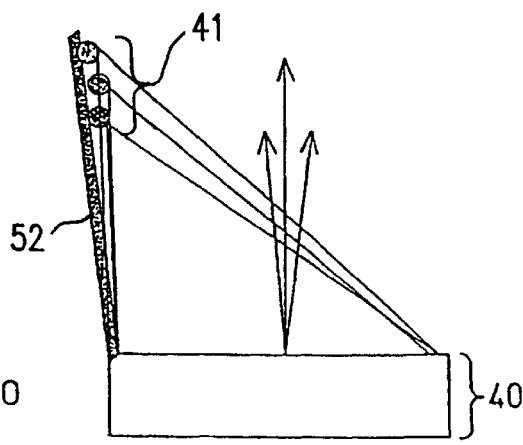

FIG. 10F is similar to FIG. 10E, but in this embodiment, the auxiliary light source 41 includes an array of red, green, and blue LEDs, and an homogenizer (not shown). In each of FIGS. 10E and 10F, the light source 41 is attached to a flip-arm 52 of the LCD 40.

Figure 10G:
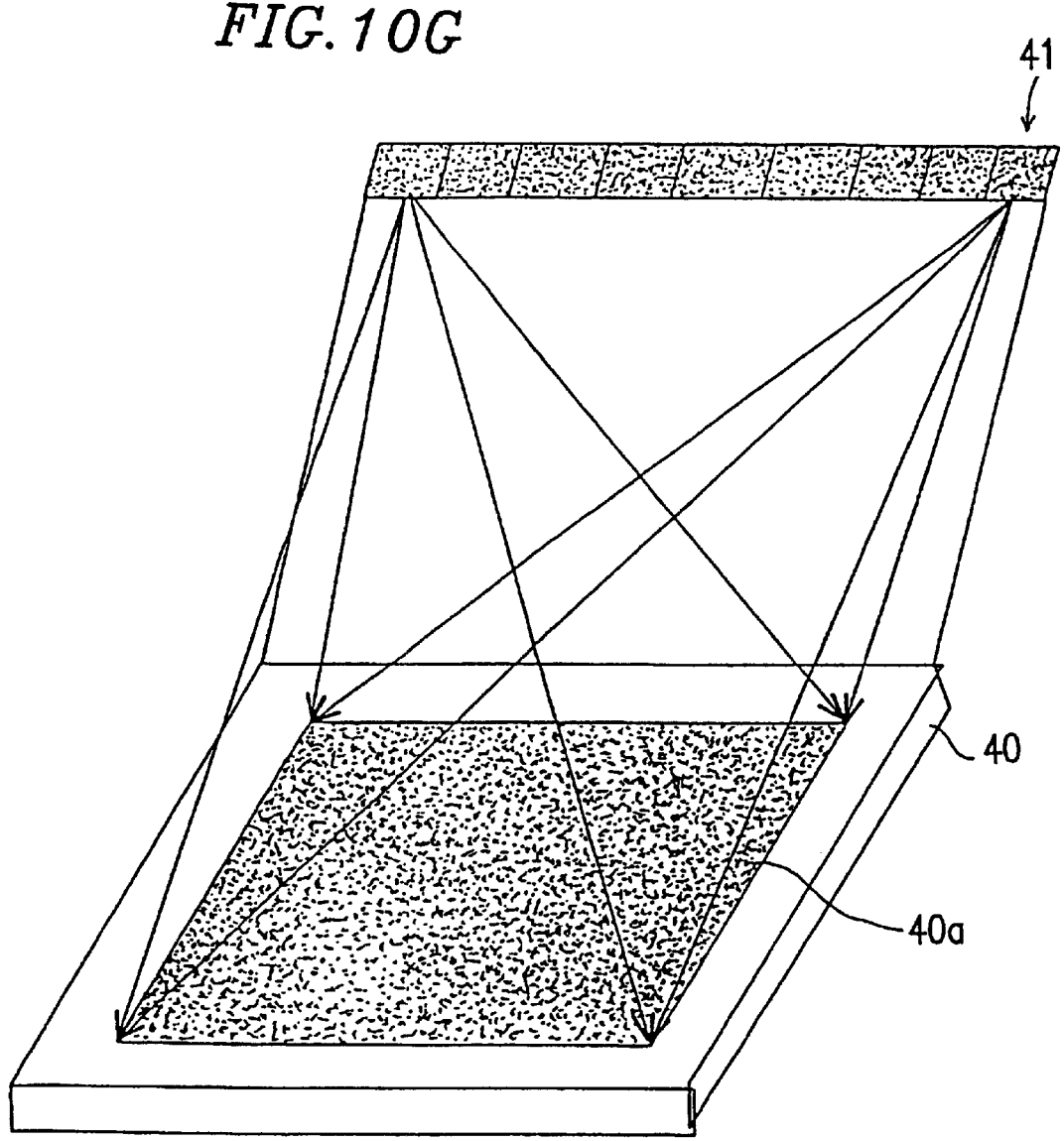
Figure 10H:
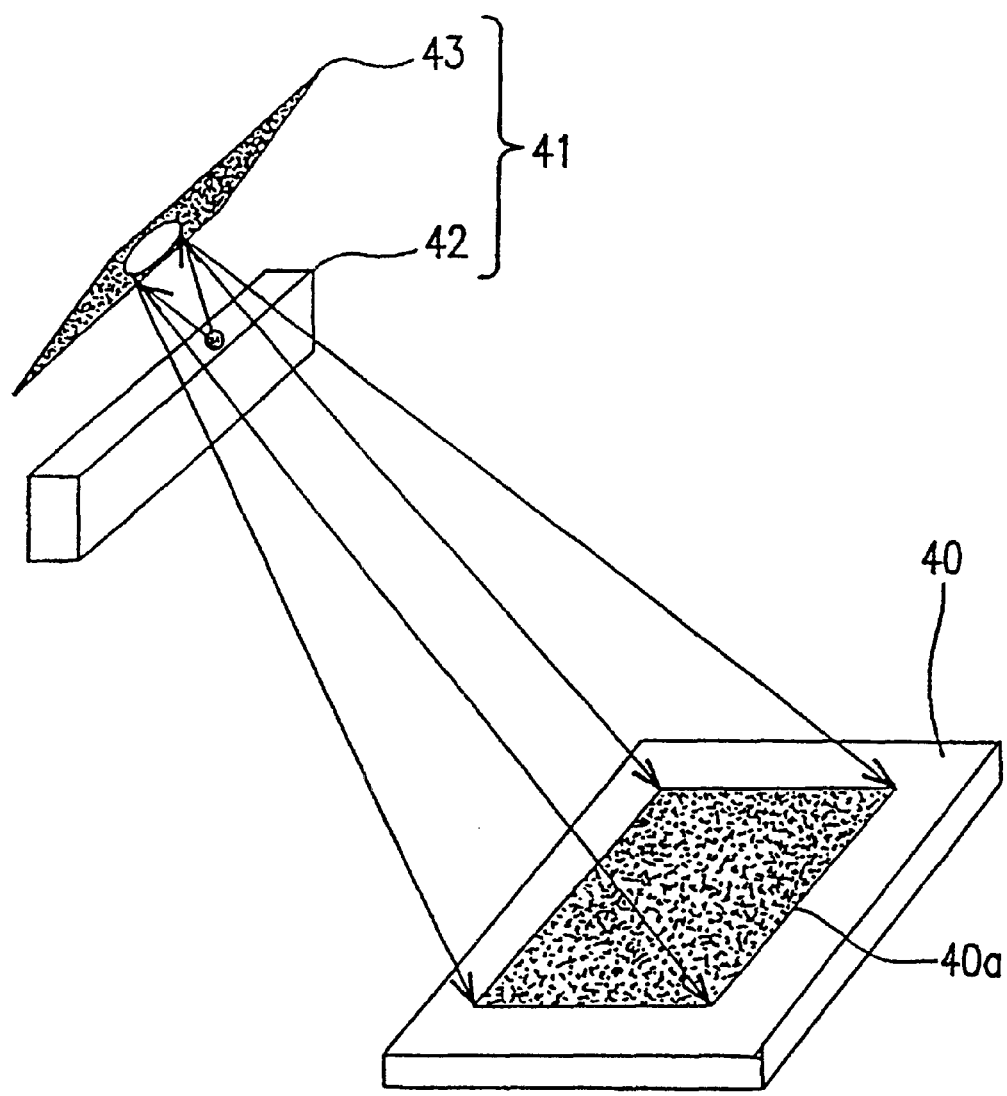

FIG. 10H is a schematic perspective view of an embodiment of a front illumination system for an LCD (BRLCD) in which the light source 41 includes an array 42 of LEDs and a target area 40a of the LCD 40 is irradiated therewith. In this case, an array 43 of holographic homogenizers is provided for the LED arrays 42 in the light source 41 (although a single homogenizer could be used instead). If an array of LEDs is used as the light source 41, it can be mounted on the cover of the LCD 40, as shown in FIG. 10G.

In the embodiment of the invention as illustrated in FIG. 9A, the LCD 40 is formed on a glass substrate 60. On the glass substrate 60 are formed a reflective layer (internal mirror) 61, a liquid crystal layer 62, an ITO electrode layer 63, a layer of color filters 64, an upper glass substrate 65, and a polarizer 66. Electrodes (not shown) are disposed at the interface between the substrate 60 and the reflective layer 61, so that an electric field can be applied to the liquid crystal layer 62 by applying a voltage between the electrodes on the glass substrate 60 and the ITO electrode layer 64.

Furthermore, a holographic element (holographic field element) 67 is disposed over the polarizer 66. This holographic element 67 differs from the holographic element shown in FIG. 1A, in that the present invention shown in FIG. 9A uses a holographic field lens 67. In the embodiment of FIG. 9A, the holographic field lens 67 is a transmission holographic field lens. The use of such an lens 67 as the holographic element 67 means that the holographic element 67 only functions when illuminated by the closely positioned auxiliary light source 41, and has substantially no effect when used in ambient lighting condition.

Figure 11A:
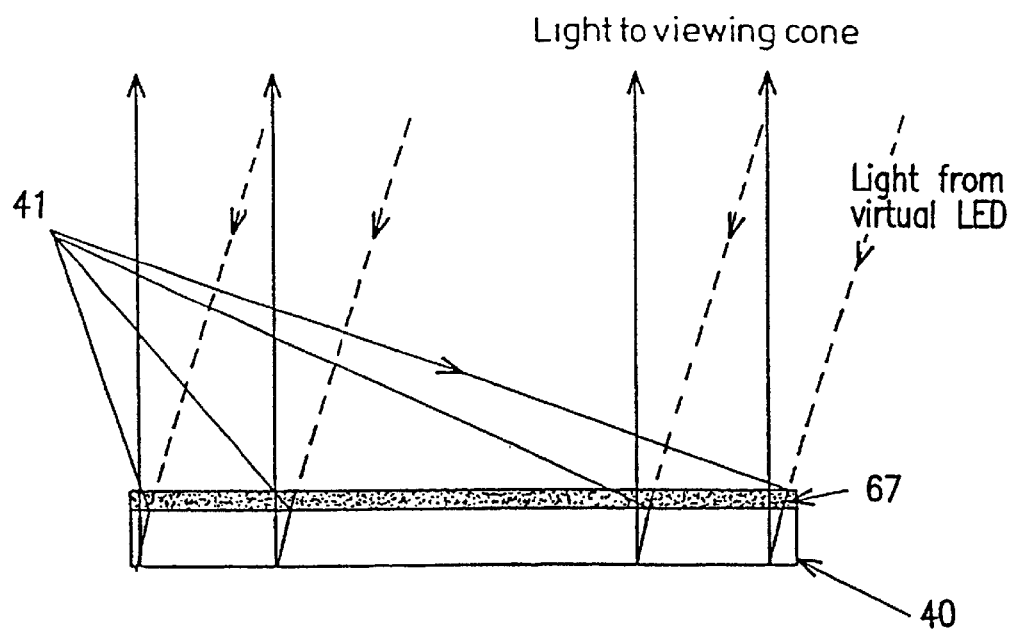
FIGS. 11A and 11B illustrate the illumination of a reflective LDC according the present invention.

The transmitted light rays through the holographic field lens 67 are at reverse angles. The holographic field lens 67 concentrates light from the light source 41, and directs collimated light towards the liquid crystal layer 62. This has the effect of producing a virtual light source at infinity, as shown schematically in FIG. 11A.

Figure 9B:
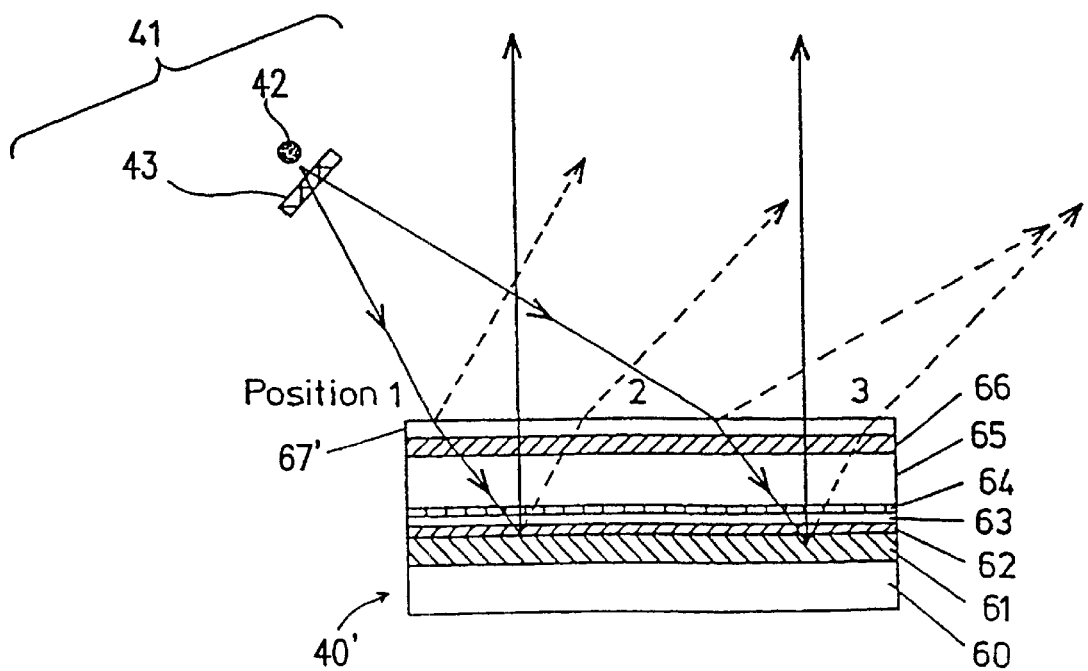
FIG. 9B is a cross-section of a reflective LCD according to a second embodiment of the present invention.
Figure 9E:
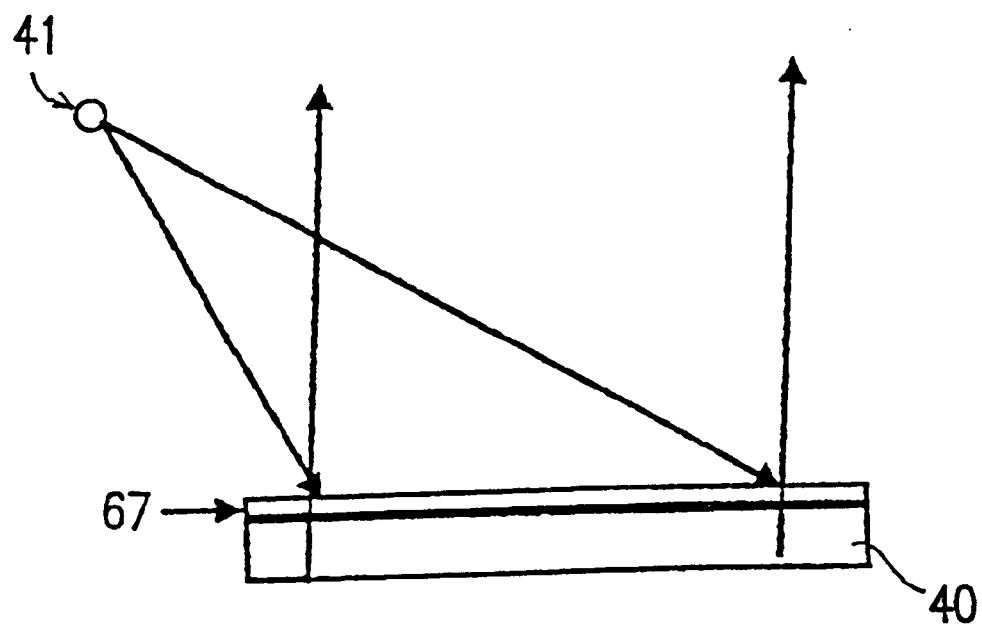
FIG. 9E illustrates the principle of operation of a reflective LCD according to the present invention.

FIG. 9E is a schematic illustration of the principle of operation of the LCD 40 of FIG. 9A. As shown in FIG. 9E, the LCD 40 of the present invention is illuminated by diverging light, from an auxiliary light source 41 that is positioned close to, but offset from, the display 40. The diverging light incident on the LCD 40 is collimated by the holographic field lens 67, and is redirected into a collimated beam propagating substantially on-axis. In contrast to the holographic elements of the prior art devices as described above, the Bragg angle of the holographic field element 67 of the present invention varies over the holographic field element 67.

The specular reflections from the front face of the LCD 40 and from the internal layers of the LCD 40 are shown in FIG. 9A. FIG. 9C explains how the effect of these specular reflections is minimized.

FIG. 9C illustrates variations of a reflected light from a holographically illuminated high gain diffuser at different illumination angles. In other words, FIG. 9C shows the intensity of light returned by the LCD as a function of angle (measured from the normal axis to the LCD panel). The intensity is shown for three separate positions across the LCD panel with position 1 being closest to the light source and position 3 being furthest from the light source.

The reflection from the LCD panel is divided into the following three components: (1) the specular reflection (A1)

from the front surface; (2) the specular reflection (A2) of the holographic illumination from the internal LCD layers, e.g., from the ITO electrode layer 63; and (3) the diffuse reflection (C) from the LCD (i.e., distribution of intensity from the high gain diffuser).

The angle at which the specular reflection (A1) from the front surface of the LCD occurs varies across the LCD as illustrated in FIGS. 9A and 9C. However, as the light directed into the LCD 40 is collimated by the holographic field element 67, the specular reflection (A2) from the internal LCD layers occurs at a fixed angle across the LCD panel. The angular distribution (C) of light reflected by the reflective layer 61, which is a high-gain diffusing reflective layer, is also constant across the LCD panel 40, again because the reflective layer 61 receives light that has been collimated by the holographic field element 67. Since the angular distribution of the intensity (C) of light reflected by the reflective layer 61 is constant across the LCD panel 40, it follows that an observer viewing the LCD panel 40 along its normal axis will see a constant intensity across the LCD panel 40, as is illustrated in FIG. 9C as I1, I2, I3. Thus, the LCD 40 appears to be uniformly illuminated across the panel 40 so that, as the observer moves sideways with respect to the LCD panel 40, the intensity of the display 40 does not change.

FIG. 9C also shows the maximum possible viewing zone (or "useful angular freedom") of the display as (B). The viewing freedom (B) of the display allows uniform display illumination in the region between the specular reflections and the drop off point of the diffuse output of the rear reflector. Thus, the viewing freedom (B) of the display is determined by the specular reflection (A2) from the internal LCD layers, and by the specular reflection (A1) from the front of the LCD panel in position 1.

A modified embodiment of the invention is illustrated in FIG. 9B. The structure of the LCD panel 40" in this embodiment as shown in FIG. 9B is similar to that of FIG. 9A, except that the holographic field element 67" is adapted to transmit incident light at a forward angle. In contrast, the holographic field element 67 in FIG. 9A transmits light at a reverse angle. The same elements in FIGS. 9A and 9B are designated with the same reference numerals, and the descriptions therefor or are omitted here.

FIG. 9D illustrates variations of a reflected light from a holographically illuminated high gain diffuser of the LCD of FIG. 9B at different illumination angles. In other words, FIG. 9D shows the variation in intensity of light reflected from the LCD of FIG. 9B as a function of angle of view. As with FIG. 9C, the light reflected from the LCD panel has three components: the specular reflection (A1) from the front surface, the angle of which varies across the panel; the specular reflection (A2) of light from internal LCD layers; and diffuse reflection (C) from the reflective layer 61. Since the light incident on the LCD panel 40' is collimated by the holographic field element 67', the specular reflection (A2) from the internal layers in the LCD 40' occurs at a constant angle across the LCD 40'. The diffuse reflection (C) from the reflective layer 61, which again consists of a high-gain reflective layer, also has a constant intensity against angle distribution across the whole of the LCD 40'.

As is shown in FIG. 9D, the useful viewing angle (B) of the display 40' of FIG. 9B is determined by the region between the specular reflection from the internal LCD layers on the one hand, and the drop-off point of the diffuse output of the rear reflector on the other hand. FIG. 9D shows that the intensity of light reflected to an observer along the normal axis of the LCD remains constant over the area of the LCD display, as being understood from I1, I2, I3.

Thus, the LCDs shown in FIGS. 9A and 9B are suitable for use with an auxiliary light source that is positioned close to the LCD. The use of a holographic field element means that it is possible to put the auxiliary light source close to the LCD and still obtain uniform illumination across the LCD screen. This means that the auxiliary light source can be conveniently mounted, for example by one of the methods described with reference to FIGS. 10A to 10H.

Figure 11B:
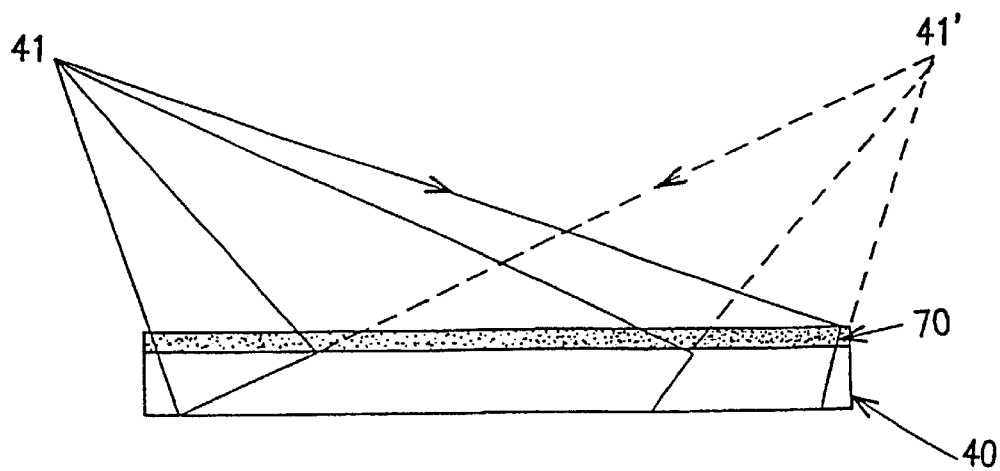

Although the holographic field lens in the embodiments shown in FIGS. 9A and 9B collimate light from the auxiliary light source, it is not necessary for the holographic field lens 67 to do this. FIG. 11B illustrates a further embodiment of the invention in which the holographic field element 70 operates with 50% efficiency across its surface so as to replicate a second closely positioned light source 41'. This provides an improved uniformity of illumination compared to a single closely spaced light source in the absence of a holographic field lens.

Figure 12A:
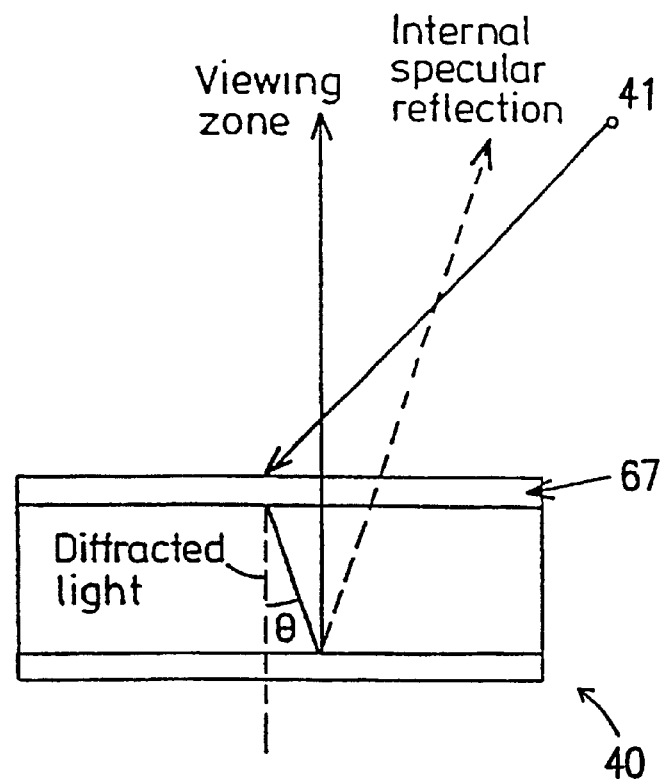
FIGS. 12A and 12B illustrate the minimal diffraction angle in a holographic field lens to suppress the interaction of a return beam.

The principle of operation of the holographic field lens 67 (and its equivalent described in the present application) is summarized in FIG. 12A. This shows that the light from the auxiliary light source 41 is diffracted by the holographic field element 67, and is directed into the LCD 40 at an angle θ to the normal axis to the LCD 40, as a collimated beam of light. FIG. 12A also illustrates diffraction of the return light after the reflection by the LCD internal mirror.

Figure 12B:
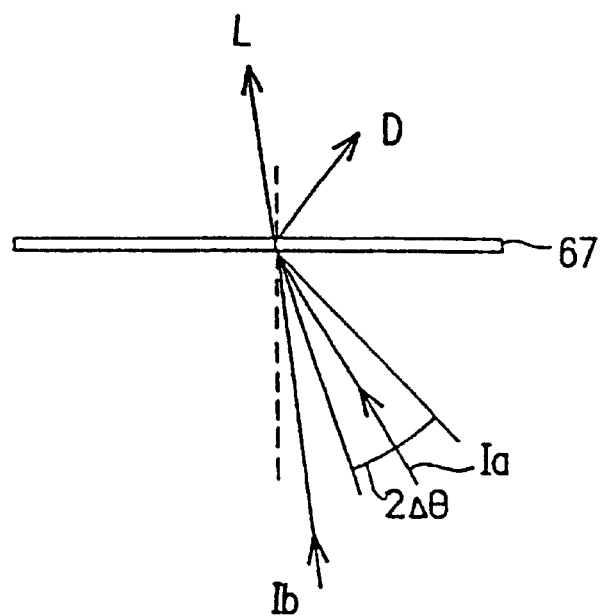

The angle of diffraction θ of the collimated beam in the holographic field lens of FIG. 9A or 9B should be chosen to satisfy two principal requirements. Firstly, the light source should be re-imaged as a virtual, substantially on-axis, source. This is to maximize and make uniform the brightness of the display in the direction of an on-axis observer, as explained above with regard to FIGS. 9A to 9D. On the other hand, θ should also be chosen so as to minimize as far as possible any interaction of the diffracted beam when it passes through the holographic field lens after having been reflected by the reflective element of the LCD. If the returning light did interact substantially with the holographic field lens, it would be diffracted back towards the light source, and would not pass towards the user. In addition, the specular reflection from internal components of the LCD should not be directed into the viewing zone. Interaction between the returning diffracted beam and the holographic field lens is minimized if the output angle of the hologram (θ) is set to be outside the Bragg acceptance angle of the holographic field element 67, as shown in FIG. 12B. In FIG. 12B, when the incidence angle of the incident beam (the light reflected by the LCD internal mirror) is within the acceptance cone around the angle of diffraction (the width thereof is indicated with 2Δθ in FIG. 12B) as illustrated with the incident beam Ia, the incident beam Ia interacts with the holographic field element 67 and diffracted to be the diffracted beam D. However, when the incidence angle of the incident light beam is outside the acceptance cone as illustrated with the incident beam Ib, the incident beam Ib passes through the holographic field element 67 undiffracted to be the light beam L. Thus, light reflected by the reflective lens does not interfere with the holographic field element 67 when it is reflected back to the holographic field lens 67.

In order to minimize the diffraction of the returning light back towards the light source, the diffraction angle should be chosen such that the diffraction angle is greater than a half-width of the average angular acceptance cone of the hologram 67 as shown in FIG. 12B.

Figure 13:
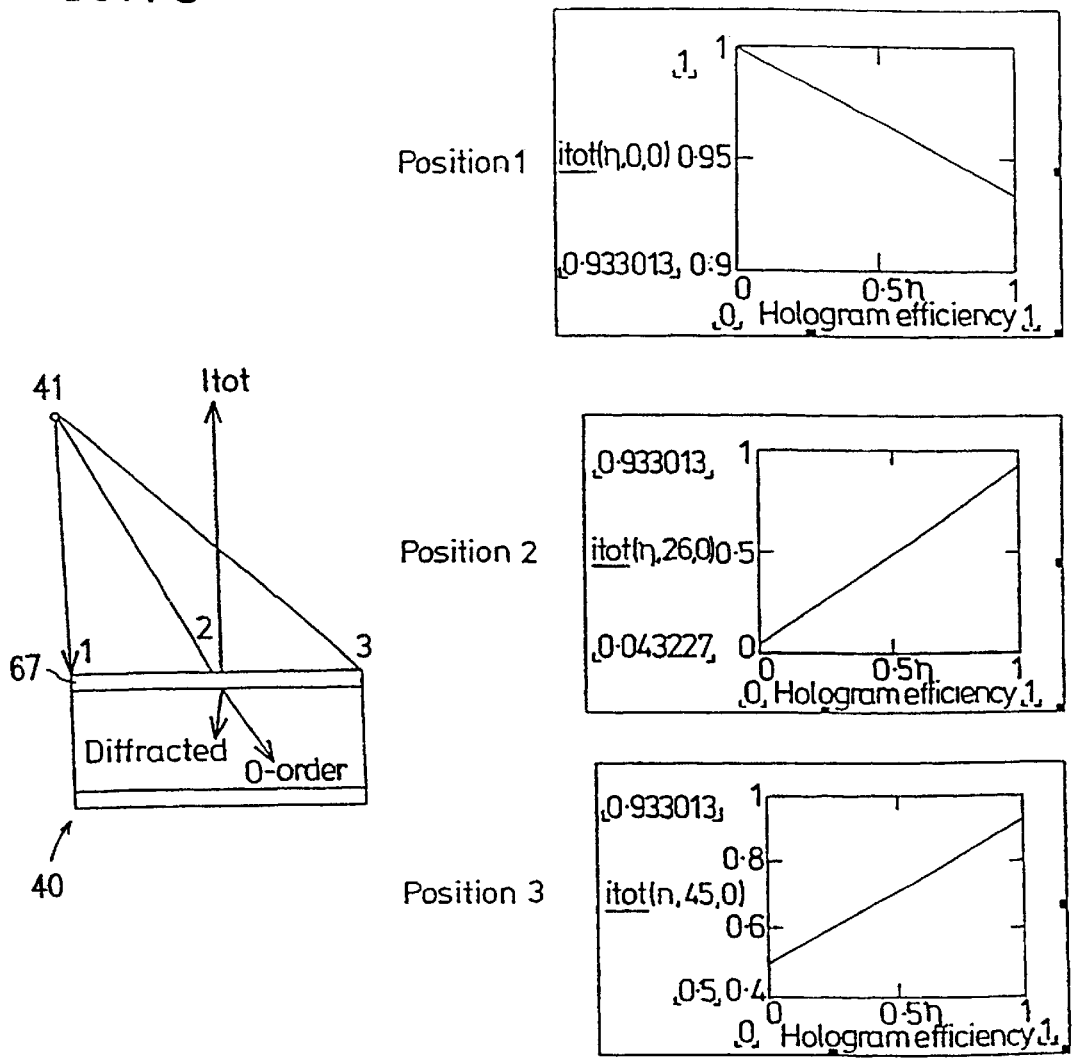
FIG. 13 shows the intensity distribution in the normal direction for three separate display areas of an LCD according to the present invention.

FIG. 13 shows the effect of variations in the diffraction efficiency of the holographic field element 67 on the output brightness of the LCD 40. Specifically, FIG. 13 shows distribution of brightness of output Itot in a normal direction for an LCD device 40 with a front illuminator employing a holographic field lens 67 for different display areas (positions) 1, 2, and 3 as a function of a diffraction efficiency of a holographic field element 67.

At position 1, the light source 41 is shown for convenience as being directly above the panel 40. If the holographic field element 67 has a 100% diffraction efficiency, all the incident light is diffracted towards the panel 40 at an angle away from the normal axis, and the reflection from the high gain reflective element (internal mirror) of the LCD 40 along the normal axis is reduced. If, on the other hand, the diffraction efficiency of the hologram element 67 is 0%, all of the light will propagate in the LCD 40 in the normal direction, and the intensity of light reflected in the normal direction towards a user will be at a maximum. Thus, the brightness of the panel 40 at position 1, as seen by an observer along the normal axis, will be reduced if the hologram element 67 has 100% diffraction efficiency, owing to the high-gain reflective element.

In contrast, at position 3 of FIG. 13, at the far edge of the panel 40 away from the light source 41, the output brightness along the normal axis will increase as the hologram diffraction efficiency increases. Thus, at position 3, it is desirable to have a high diffraction efficiency for the holographic field element 67.

It can therefore be seen that the uniformity of the output intensity of the LCD panel, across the LCD panel, can be maximized by varying the diffraction efficiency of the holographic field lens 67 over the holographic field lens 67. At position 1, it is preferable for the holographic field lens 67 to have a low efficiency, so that the reflection of the zero order light provides the bulk of the output light. At position 3, in contrast, the holographic element 67 should have a high diffraction efficiency in order to maximize the output brightness in the viewing direction.

In addition to light losses owing to the single polarizer LC mode, light losses in the LCDs shown in FIGS. 9A and 9B are mainly caused by the holographic field element absorbing or scattering light, and by reflection of light at the front surface of the LCD panel. These can be minimized by providing an antireflection coating on the front surface of the holographic field element, and by directly laminating the holographic field element on to a glass substrate of the LCD.

The present invention has a number of advantages. There is just a single diffracting element attached to the LCD, and this diffracting element is external and can be attached to an existing LCD. The holographic field element does not have an internal pixel type structure, so that it is not necessary to align the holographic field element with pixels of the LCD. Moreover, the sub-micron scale internal structure of the holographic field lens means that no Moire effects will occur.

Furthermore, a holographic field lens is an angularly discriminating element for operating under specific conditions of lighting, and does not substantially affect display characteristics under other conditions of illuminations. This means that the holographic field element will improve the uniformity of illumination from the auxiliary light source, but will not affect the characteristics of illumination of the display when illuminated by ambient light.

Figure 14:
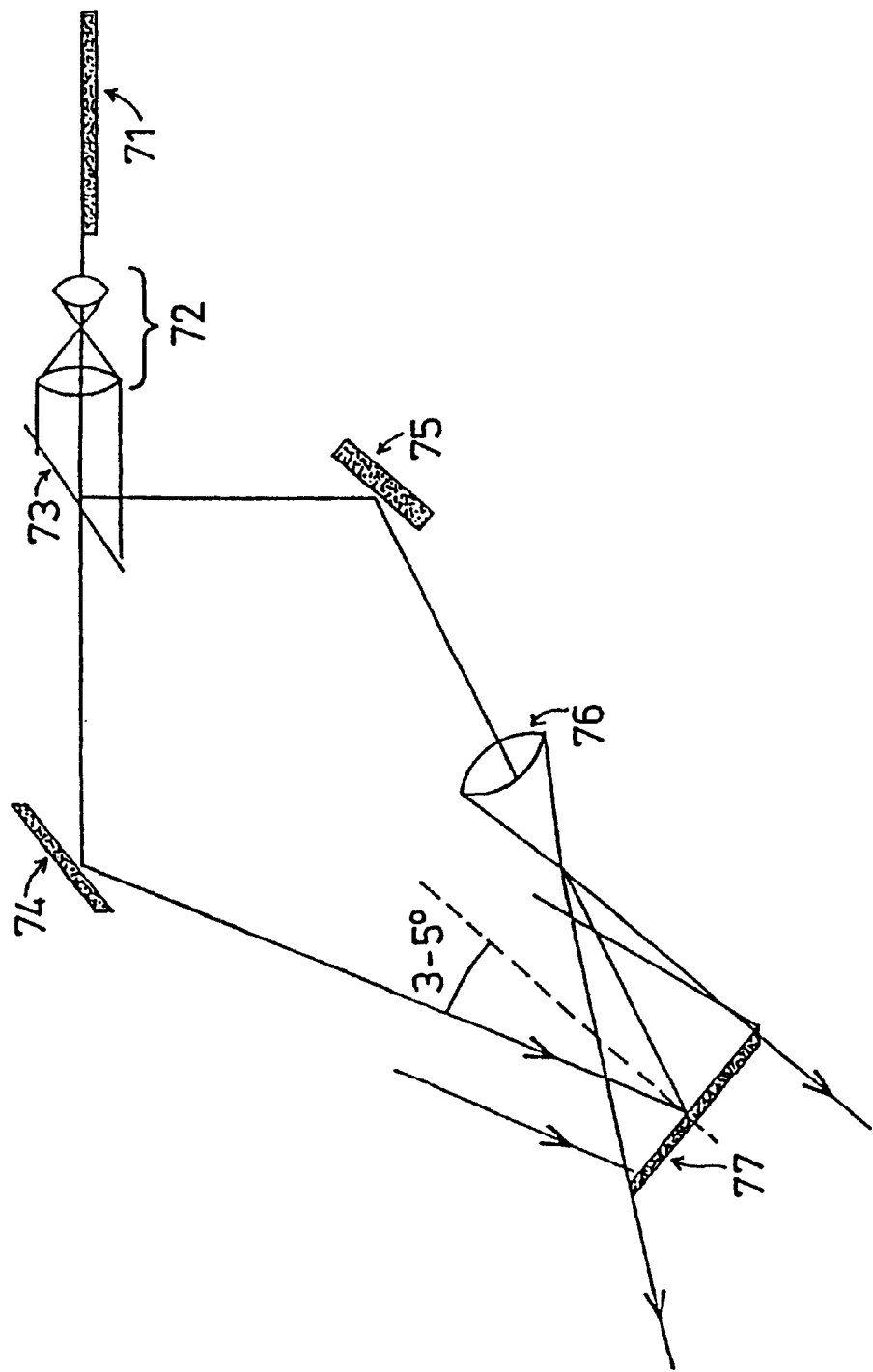
FIG. 14 schematically illustrates a method of recording the holographic field lens for an LCD of the present invention.

FIG. 14 illustrates one method of recording a holographic field element 67 for use in an LCD as illustrated in FIG. 9A or 9B.

More specifically, FIG. 14 shown principal scheme of recording of a holographic field lens (reverse diffraction), in which a recording laser 71, a spatial filter and a collimating lens (collectively referred to as 72), a beamsplitter 73, stirring mirrors 74 and 75, a lens 76, and a light sensitive sample 77 are employed. The holographic field element can be made as a single flat element, recorded using the scheme shown in FIG. 14, with the central wavelength of the holographic field element matched to the spectral characteristics of the auxiliary lightsource. Any conventional high efficiency holographic material can be used. Examples are DCG. DuPont or the Omnidex or HRF families, and the choice of a particular material will depend on the wavelength on the recording laser 71 and on the central wavelength of the auxiliary light source. Multi-step techniques for correcting aberration caused by differences in recording and read-out conditions can be applied, as is known in the art. See, for example, "Holographic elements with high efficiency and low aberrations for elements displays", Y. Amitai et al., "Applied Optics", Vol.28, pages 3405–3417, 1989.

Figure 15:
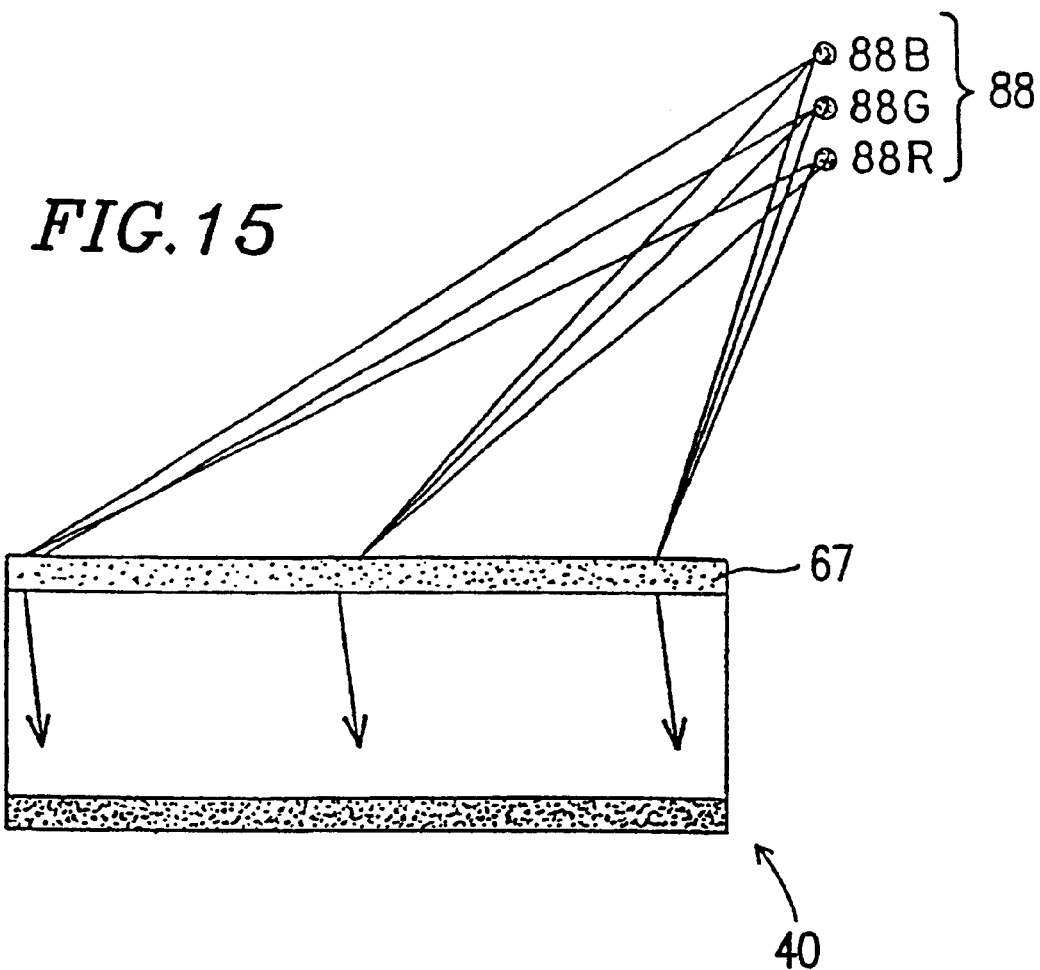
FIG. 15 is a schematic cross-section of an LCD according to a further embodiment of the present invention.

A further embodiment of the present invention is illustrated in FIG. 15. FIG. 15 shows use of chromatic dispersion of a transmission hologram in a basic embodiment of a front illuminator for a reflective LCD 40 employing a holographic field lens 67 and a distributed color light source 88.

More specifically, in this embodiment, the auxiliary light source 88 includes a distributed color LED array which contains red, green and blue LEDs 88R, 88G, 88B. The LEDs 88R, 88G, 88B are spatially separated from one another. Each of the LEDs 88R, 88G, 88B in the array is provided with an homogenizing element (not shown), to alter the shape of the output beam and to make the intensity uniform across the area of the beam. Alternatively, a single homogenizing element could be used to homogenize the output beams from all the LEDs 88R, 88G, 88B. The peak wavelengths of the LEDs 88R, 88G, 88B are preferably chosen to coincide with the transmission peaks of the color filters of the LCD 40.

The holographic field element 67 of FIG. 15 for use with the distributed color LED array 88 can again be made as a single non-pixelated element. The chromatic dispersive properties of a volume transmission hologram can be used to combine light coming from the spatially separated red, green and blue LEDs 88R, 88G, 88B, so that the holographic field lens 67 of FIG. 15 is functioning as a beam steering element, as a collimator, and as a color combiner. A single holographic field element will satisfy the Bragg conditions for effective reconstruction of a holographic lens for light from the red, green and blue LEDs 88R, 88G, 88B.

The embodiment of FIG. 15 again requires just a single diffractive element, even though a full-color light source is used. The holographic field element 67 again has no pixel structure, with the consequent advantages outlined above. Moreover, the use of a distributed color light source 88 allows the spectral characteristics of the auxiliary light source to be adjusted, for example to suit the color filters of a particular reflective LCD 40. This will improve the color balance of an LCD 40. Furthermore, as outlined above, the holographic field element 67 will not substantially affect the characteristics of the LCD 40 under operation in ambient light.

In a further embodiment, a holographic field element to be used in connection with a single-chip white light auxiliary light source can be made in a two-step rainbow configuration.

In an alternative embodiment, a holographic field element used in cooperation with a single-chip white light source can be made as a single layer pixelated element, so that its individual sub-elements coincide with corresponding color pixels of an LCD. It is then possible to match the spectral characteristics of each individual sub-element of the holographic field element to the characteristics of the LCD pixels.

In a further embodiment, the holographic field element additionally functions as a transmission off-axis weak diffuser, and has its image plane in the plane of the liquid crystal layer when it is attached to the front surface of an LCD. Such a holographic field element acts as a field lens in the manner described above, and has in addition weak diffusing properties which serve to increase the viewing angle and to further reduce any variation In brightness across an LCD. The diffuse diffracted beam is arranged to propagate at an angle of 3 to 5" from the normal axis. Such a holographic field element may be recorded by techniques similar to that illustrated in FIG. 14.

Figure 16:
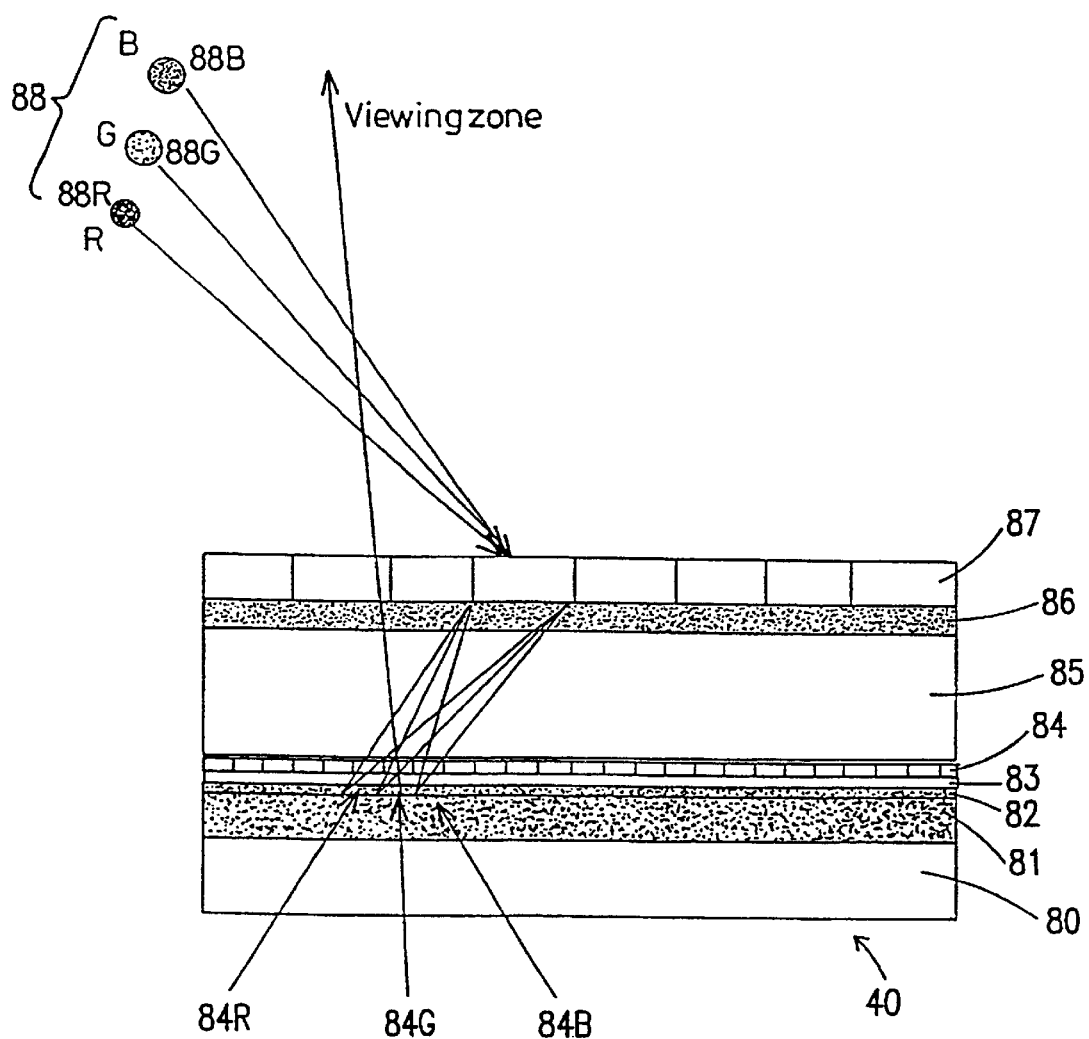
FIG. 16 is a cross-section of an LCD according to a further embodiment of the present invention.

A further embodiment of the invention is illustrated in FIG. 16. FIG. 16 shows a cross-sectional view of a basic configuration of a front illuminator employing distributed color light source 88 and a holographic microlens array 87.

In this embodiment, the LCD 40 comprises a glass substrate 80, a reflective layer (internal mirror) 81, a liquid crystal layer 82, an ITO electrode layer 83, a layer of color filters 84, a glass substrate 85, a polarizer 86, and a holographic field lens embodied as a holographic microlens array 87. The LCD 40 is illuminated by an auxiliary light source 88 that includes three LEDs 88B, 88G, 88R for emitting blue, green and red light, respectively. The color filters 84 include a red filter 84R, a blue filter 84B and a green filter 84G.

The LEDs 88R, 88G, 88B are offset from the LCD 40, and are provided with an associated beam shaping homogenizing element (not shown). The array of the individual LEDs 88R, 88G, 88B with the homogenizers are arranged to match conditions of effective diffraction for corresponding emitting spectral range. Moreover, the three individual LEDs 88R, 88G, 88B are tuned for alignment of the color spots on the color filters 84R, 84G, 88B, respectively.

The transmission holographic microlens array 87 has its focal plane within or close to the liquid crystal layer 82. The holographic microlens array 87 directs the incoming light from the LEDs 88B, 88G, 88R so that red light is directed to the red filter 84R, green light is directed to the green filter 84G and blue light is directed to the blue filter 84B, respectively. The optical axis of each microlens is at an angle of 3" to 5" with the normal axis to the display surface.

One advantage of this embodiment is that all light from an LED is concentrated in the aperture of an appropriate liquid crystal cell. This embodiment is also particularly beneficial for use with a distributed color light source, since it is possible to use a single microlens element to illuminate three color pixels (a red pixel, a green pixel and a blue pixel) by adopting a suitable spatial arrangement of the LEDs. This arrangement enables the microlens array to perform color splitting, such that substantially all light of a particular color goes to a pixel of that color. This avoids absorption losses in pixels of other colors.

The holographic microlens array 87 of FIG. 16 is not acting as a beam combiner (as is the case in FIG. 15), and light of each wavelength is processed separately by the microlens array 87. This enables each microlens to be made the size of three individual color pixels, and this reduces the tolerance requirements of the LCD 40.

The diffractive nature of the holographic microlens array 87 is essential in order to avoid the interaction of light returned from the reflective layer 81 with the microlens array 87. The reflection by the reflective layer 81 doubles the angle of diffraction, so that the reflected light is beyond the Bragg acceptance angle so that output light in the useful viewing direction is not diffracted when it returns to the holographic microlens array 87.

In a further embodiment (not illustrated), the distributed color light source of FIG. 16 is replaced by an offset single-chip white light LED. In this embodiment, the transmission holographic microlens array must be provided with an additional pixel structure, which is aligned with the pixel structure of the LCD so that the spectral characteristics of individual sub elements of the holographic microlens array are matched with the characteristics of the color filters.

Figure 17A:
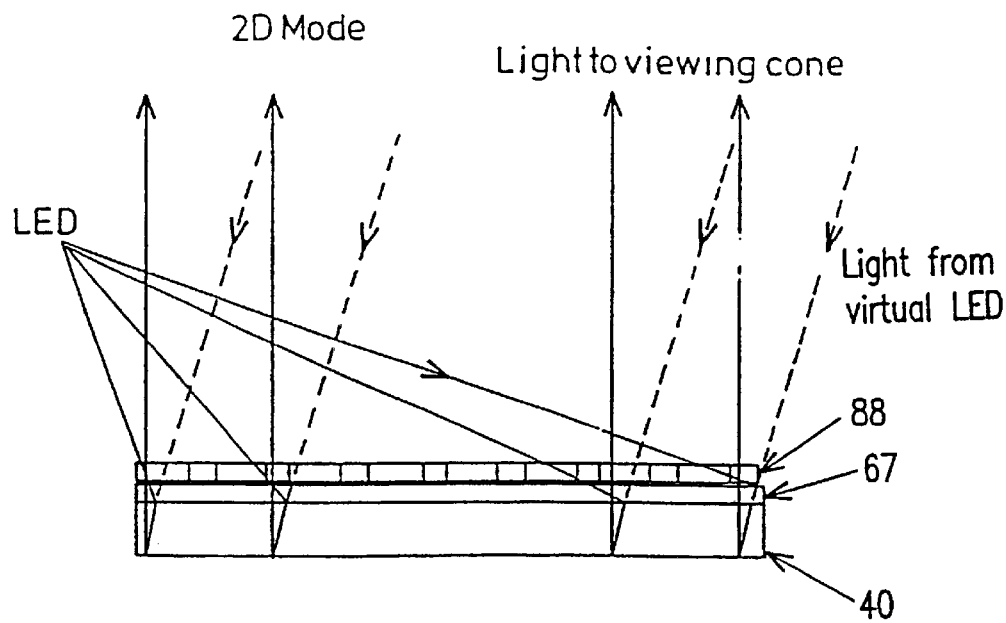
FIGS. 17A and 17B schematically illustrate the use of a reflective LCD according to the present invention in a 3D display.
Figure 17B:
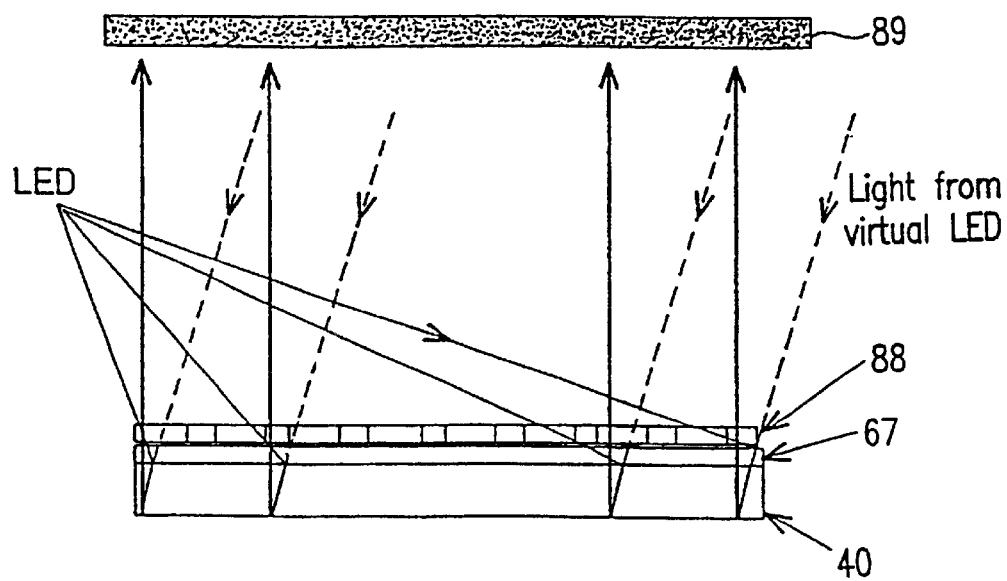

The application of an LCD 40 with a hologram element 67 of the present invention in a 3D display system is shown in each of FIG. 17A (2D mode) and FIG. 17B (3D mode). This is achieved by providing the LCD 40 of, for example, FIG. 9A with an array of wave plates (e.g., 2D/3D retarder barrier) 88. This is described in detail in UK Patent Application No. 9713985.1/2 317 295, the contents of which are hereby incorporated by reference.

In the 3D mode shown in FIG. 17B, a polarizer 89 is further provided. This generates a parallax barrier, so that a 3D image can be displayed. In the 2D mode as illustrated in FIG. 17A, no polarizer is provided so that the retarder barriers 88 have no effect.

Figure 18:
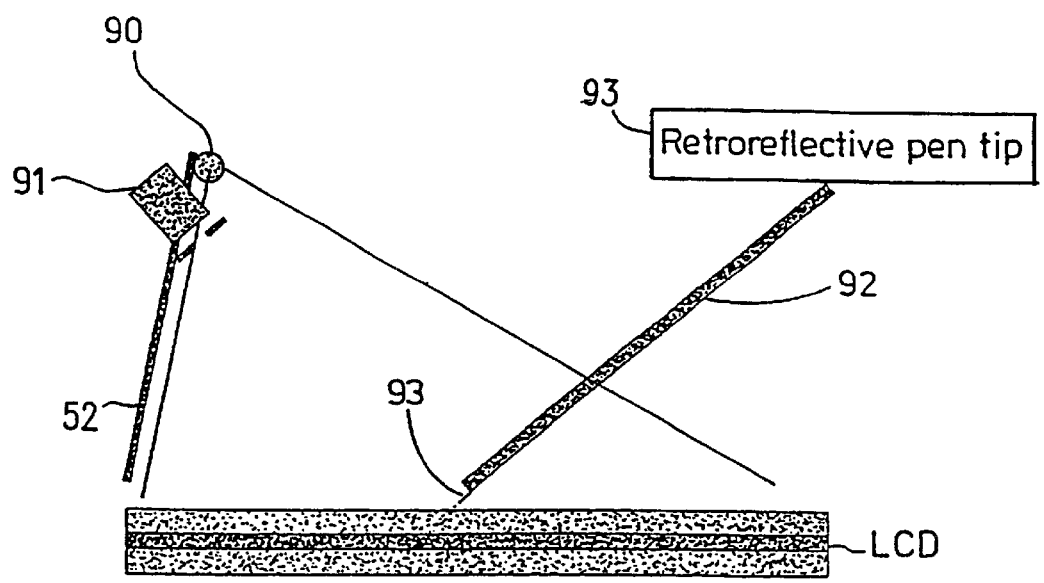
FIG. 18 is a schematic cross-section of a touch screen display device based on a reflective LCD of the present invention.

A further embodiment of the invention is illustrated in FIG. 18. FIG. 18 is a cross-sectional view of a basic configuration of a touch screen display apparatus based on a reflective LCD, and shows how an LCD can be modified to act as a high resolution LCD touch screen. This is done by mounting an infra-red (IR) LED 90 of the auxiliary light source and a position sensitive detector (PSD) 91 adjacent thereto. If the auxiliary light source is mounted on an arm 52 of the LCD as shown in FIG. 10C, the IR LED 90 and the position sensitive detector 91 can be mounted on the arm 52.

A pen 92 is provided with a retroreflective pen tip 93. Light from the IR LED 90 is reflected by the retroreflective pen tip 93, and is detected by the position sensitive detector 91. The co-ordinates of the pen tip 93 can be calculated from the detected image.

Figure 19:
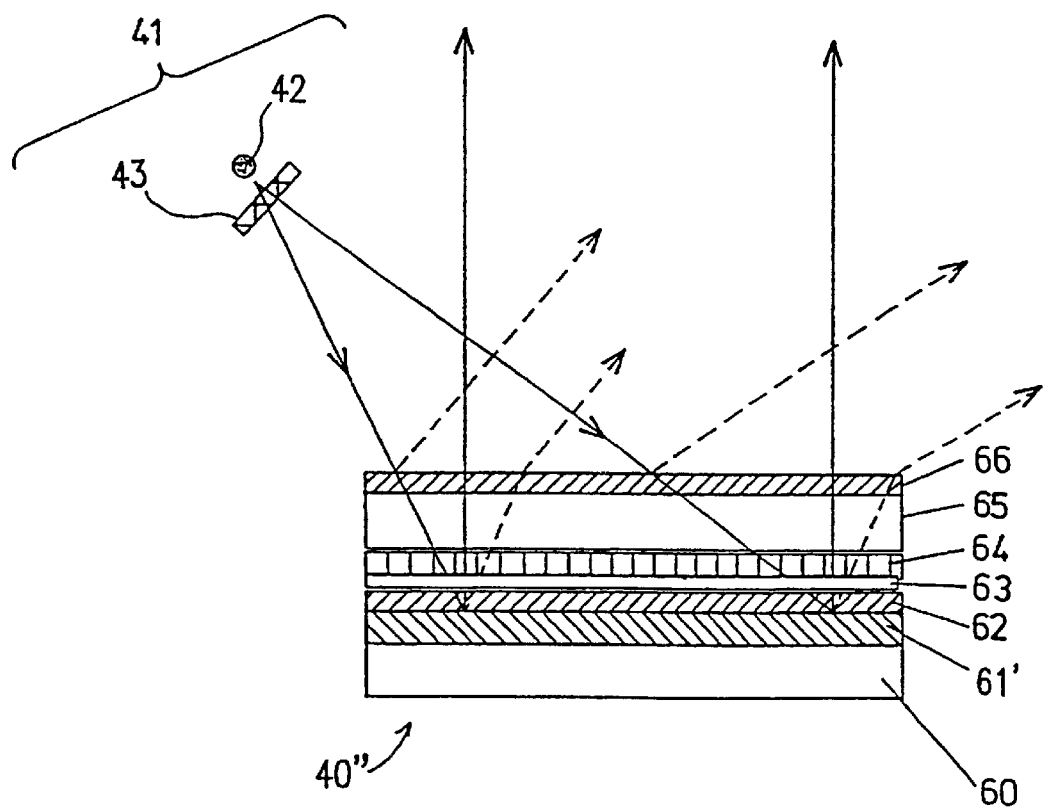
FIG. 19 is a cross-section of an LCD according to a further embodiment of the present invention.

A further embodiment of the invention is illustrated in FIG. 19, which shows a cross-sectional view of a basic configuration of one possible embodiment of a front illumination system for a BRLCD 40" employing an element 61' including a rear holographic reflective diffuser combined with an LCD internal mirror (reflective layer).

The configuration of FIG. 19 is similar to the embodiment of FIG. 9A. However, as described above, rather than having a separate holographic field lens 67 and a reflective layer 61 as in FIG. 9A, the reflective layer 61' of FIG. 19 also incorporates a holographic off-axis diffuser, and thus, the resultant layer 61' functions as a holographic field lens. The elements already described with reference the previous figures are designated with the same reference numerals, and the descriptions thereof are omitted here.

Figure 20:
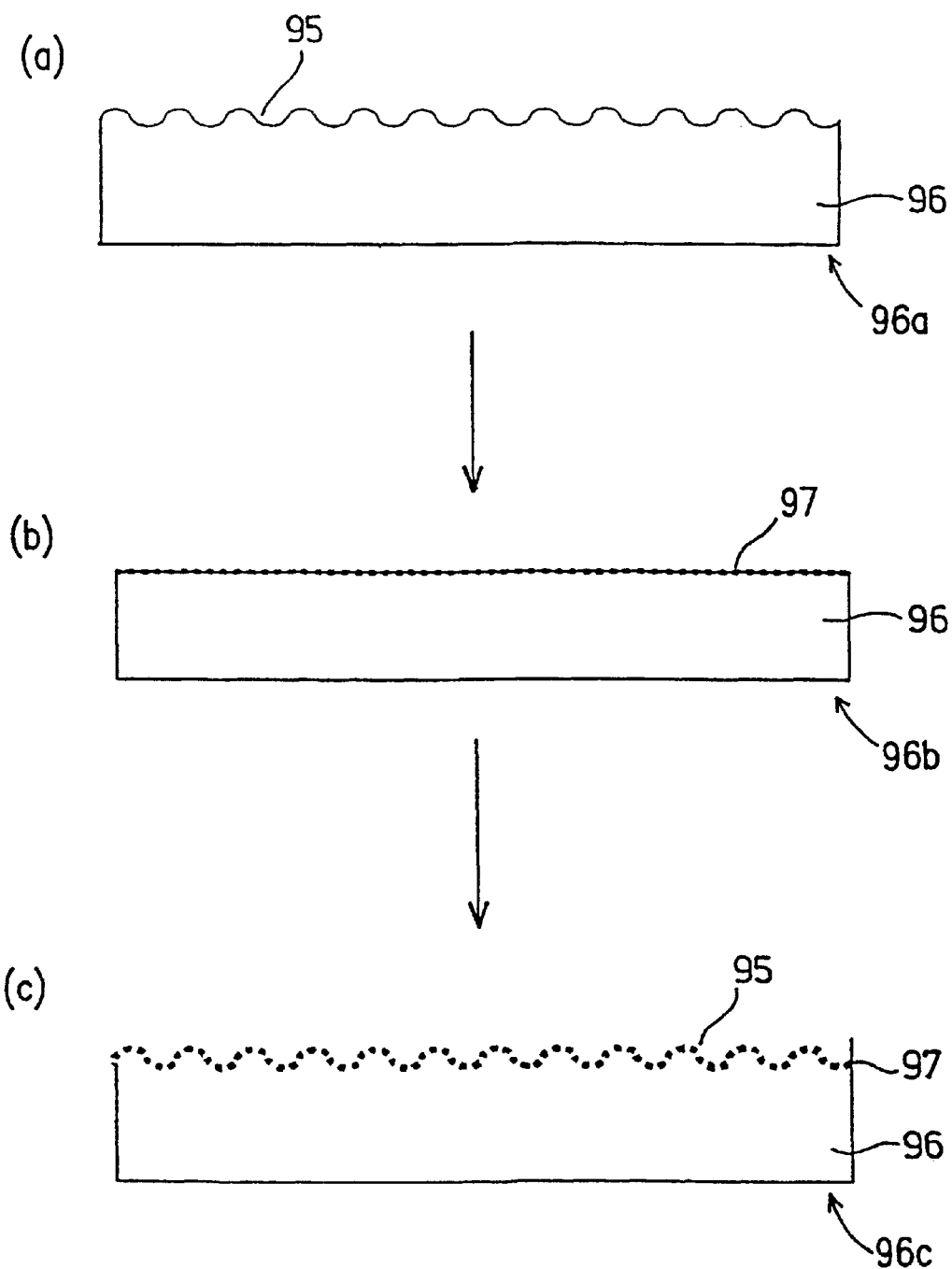
FIG. 20 illustrates: (a) a schematic cross-section of a high-gain reflective diffuser; (b) a schematic cross-section of an off-axis holographic diffuser; and (c) a schematic cross-section of one embodiment of the reflective diffuser e LCD of FIG. 19.

FIG. 20 shows schematic cross sectional views of a proposed configuration of an internal reflector for a BRLCD in which a conventional high-gain diffuser as shown in (a) and an off-axis holographic diffuser as shown in (b) are combined into a single unit as shown in (c).

More specifically, the portion (a) of FIG. 20 shows a conventional high-gain reflective diffuser 96a, suitable for use as the reflective layer (internal mirror) 61 of FIG. 9A. This diffuser 96a has a metallized surface relief structure 95 defined in a light-sensitive material 96 such as photo-resist. On the other hand, an off-axis surface relief holographic diffuser 96b, having a surface structure 97 also defined in a light sensitive material 96, is illustrated in the portion (b) of FIG. 20. The high-gain reflective diffuser 96a and the off-axis surface relief holographic diffuser 96b can be recorded sequentially in a single substrate 96, of light-sensitive material and processed together so as to have the superposition of the two surface structures 95 and 97 on the surface of the substrate 96, as illustrated in the portion (c) of FIG. 20. The resultant structure 96c is used as the reflective layer 61' of FIG. 19. As noted above, a separate holographic field lens is not required in this embodiment.

A holographic off-axis reflective diffuser is recorded as a result of interaction between light from an off-axis point source, and an on-axis diffuser having an image plane which coincides with the liquid crystal layer. The off-axis point source has angular characteristics and a position which simulate those of an intended illuminator.

Figure 21A:
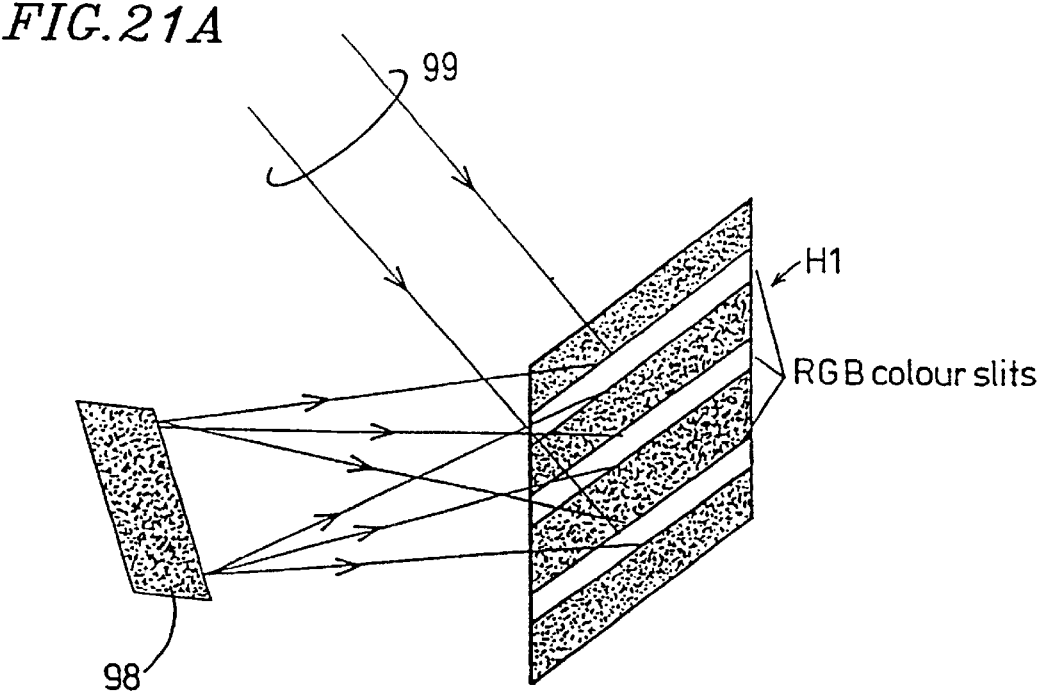
FIGS. 21A and 21B illustrate a method of recording a three-color holographic off-axis diffuser.
Figure 21B:
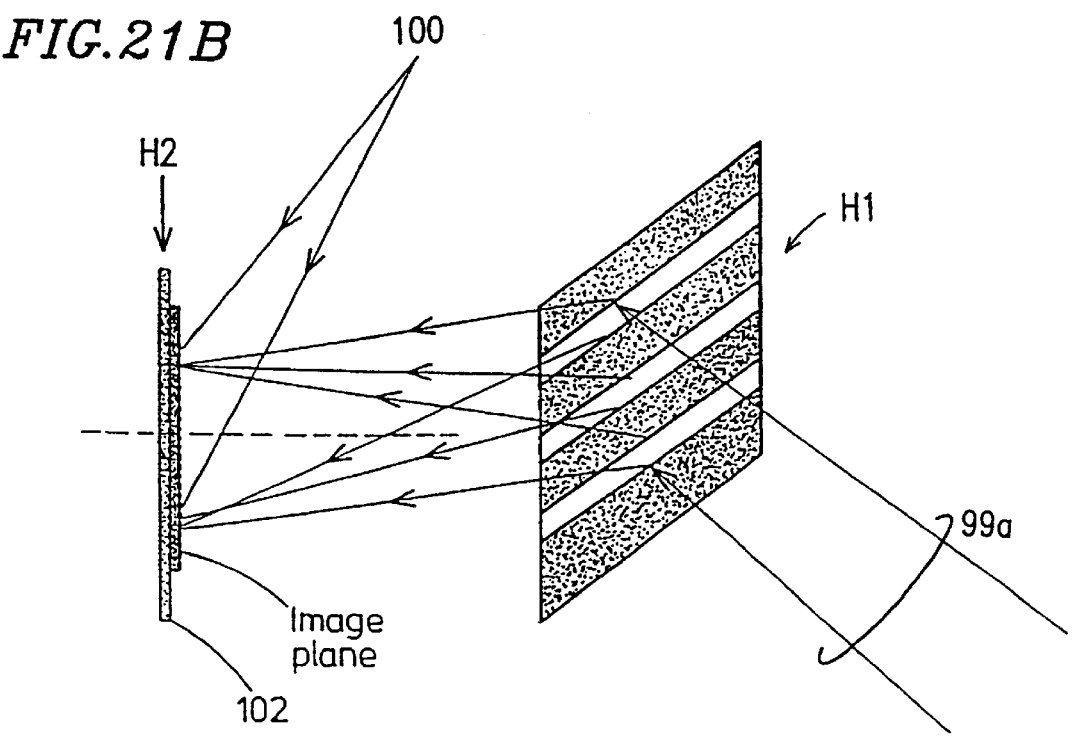

Such an element may be recorded in a two-stage process, which will be described below with references to FIGS. 21A and 21B illustrating a principal scheme of a recording of three-color holographic off-axis diffuser.

The first stage is shown in FIG. 21A. This involves recording an object 98, i.e., an on-axis diffuse plane 98 having angular characteristics which are similar to the desired useful viewing range of a display device. The shape of the diffuse plane 98 corresponds to the shape of the display device. This is recorded in the plane H1 using a reference beam 99 of plane waves.

The second stage of the process is illustrated in FIG. 21B. In this stage, the plane H1 is reconstructed using a beam 99a conjugated to the reference beam 99 used to record the plane H1 in FIG. 21A, and thus, reconstructs an image of diffuse plane 98. This secondary image (i.e., the reconstructed image) is used as a new object for recording in the H2 plane, with an off-axis point source 100 with characteristics close to those of the intended illuminator for the LCD. A light-sensitive substrate 102 is positioned just behind the image plane of the plane H1, so that a holographic diffuser reconstructed by the plane H2 at the image plane spatially coincides with the plane of the liquid crystal layer (the term "liquid crystal layer" refers to the liquid crystal layer in the intended LCD). The diffuser gives the appearance of spatially uniform illumination in the direction of an observer perpendicular to its display surface. To obtain a full-color chromatically corrected diffuser, a modification of the known rainbow hologram technique can be used.

In the above-described process, the plane H2 has the same light-sensitive layer as for the internal reflector of the LCD. Moreover, the angle of incidence and the angular characteristics of the reference beam are defined by a position of the illumination source.

Figure 22:
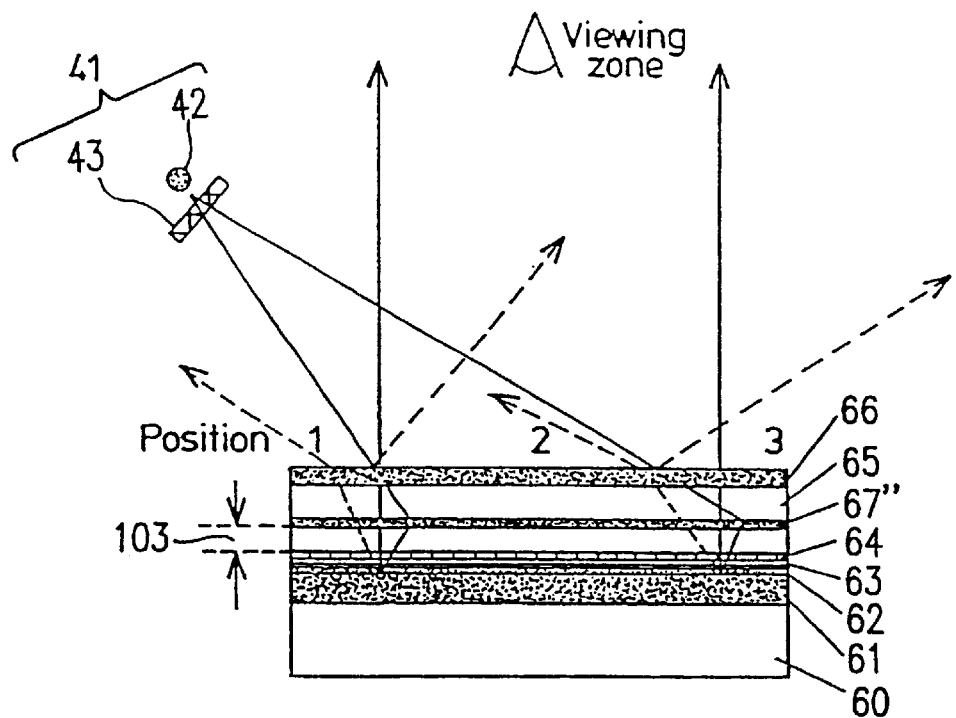
FIG. 22 is a cross-section of an LCD according to a further embodiment of the present invention.

A further embodiment of the invention is illustrated in FIG. 22, which shows a cross-sectional view of a possible embodiment of an LCD device employing an internal holographic field lens.

The configuration of FIG. 22 is similar to the embodiment of FIG. 9A, but the external holographic field lens 67 of FIG. 9A is replaced in FIG. 22 by an internal holographic lens 67". The same components in FIG. 9A and FIG. 22 are designated with the same reference numerals, and the descriptions thereof may be omitted here.

In FIG. 22, placing the holographic lens 67" close to the liquid crystal layer 62 reduces hologram scatter. In this embodiment, the holographic lens 67" is spaced between a thin transparent layer 103 (a thin piece of glass which supports the color filters 64, the ITO layer 63 and the alignment layers (not shown)), and the upper substrate 65 as a thicker piece which provides structural support, e.g., having a glass thickness of 0.2 mm. The thin layer 103 can be, for example, glass. Separating the holographic lens 67" from the liquid crystal layer 62 prevents possible contamination of the liquid crystal layer 62 by holographic materials, and thus prevents problems with the holding ratio of the device.

The internal holographic lens 67" of FIG. 22 functions in the same manner as described above for the external holographic lens 67 of FIG. 9A.

Figure 23:
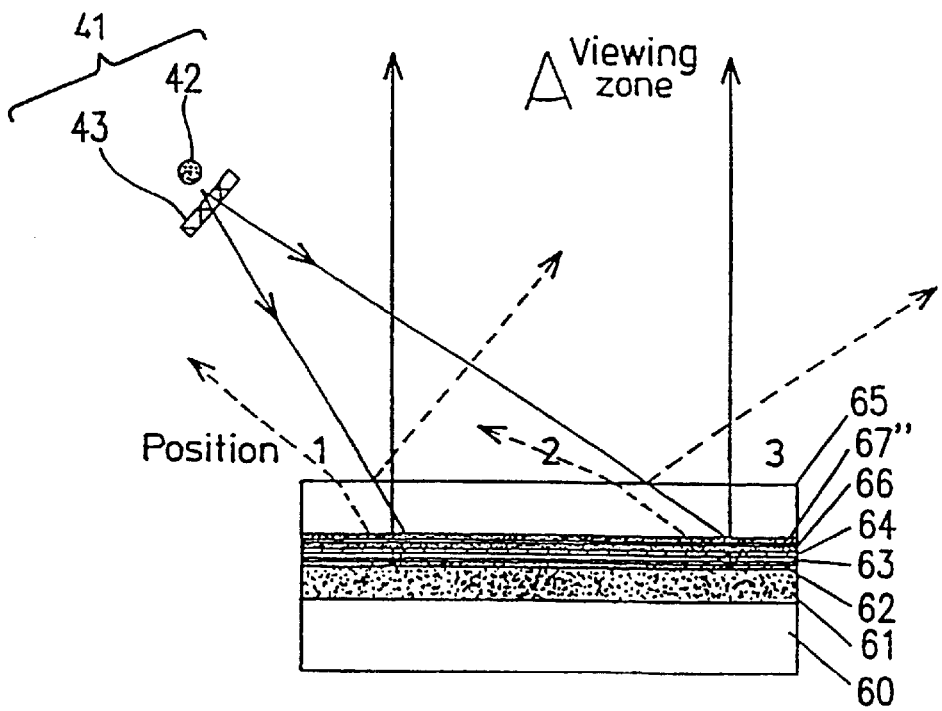
FIG. 23 cross-section of an LCD according to a further embodiment of the present invention.

Furthermore, FIG. 23 shows a cross-sectional view of a possible embodiment of an LCD device employing an internal holographic field lens and an internal polarizer.

The embodiment of FIG. 23 is similar to that of FIG. 22. In this embodiment, the polarizer 66 is also disposed inside the LCD, between the internal holographic lens 67" and the color filter layer 64. In this embodiment, the polarizer 66 provides a barrier between the holographic lens 67" and the liquid crystal layer 62, so that the thin layer 103 of FIG. 22 can be omitted. The holographic lens 67" is again placed close to the liquid crystal layer 62, so that use of such an internal hologram 67" allows reduction in a loss of contrast due to hologram scatter.

Figure 24:
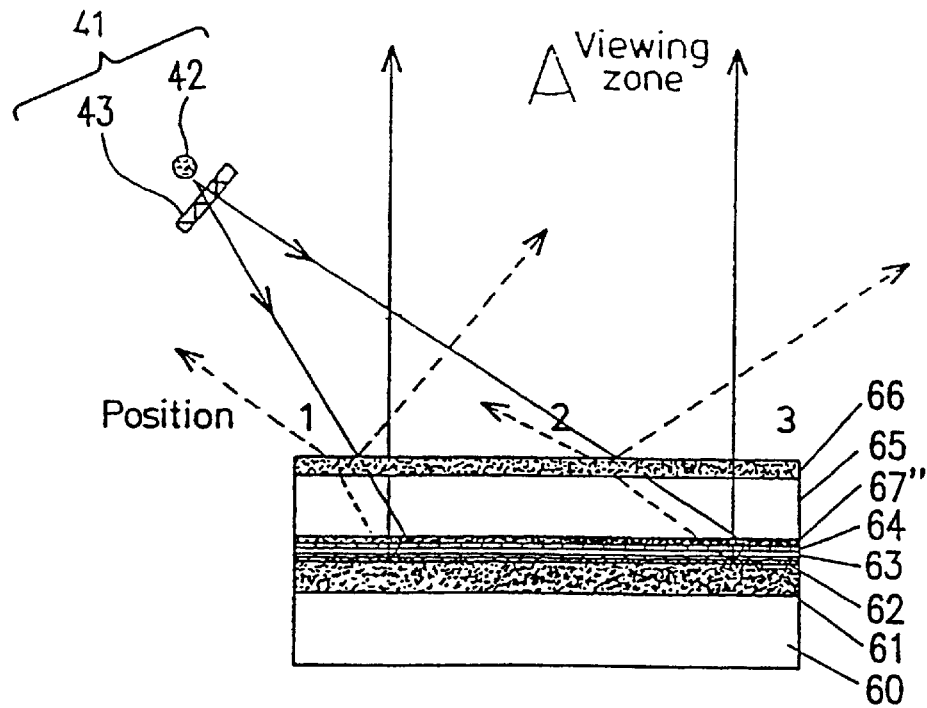
FIG. 24 is a cross-section of an LCD according to a further embodiment of the present invention.

FIG. 24 shows, as a further embodiment of the invention, a cross-sectional view of a possible embodiment of an LCD device employing an internal holographic field lens. The configuration in FIG. 24 corresponds to that in FIG. 22, but the thin layer 103 of FIG. 22 is not present. This embodiment again has a reduced loss of contrast due to hologram scatter, since the holographic lens 67" is close to the liquid crystal layer 62. However, there is a risk of contamination of the liquid crystal layer 62 by materials from the holographic layer 67".

Figure 25:
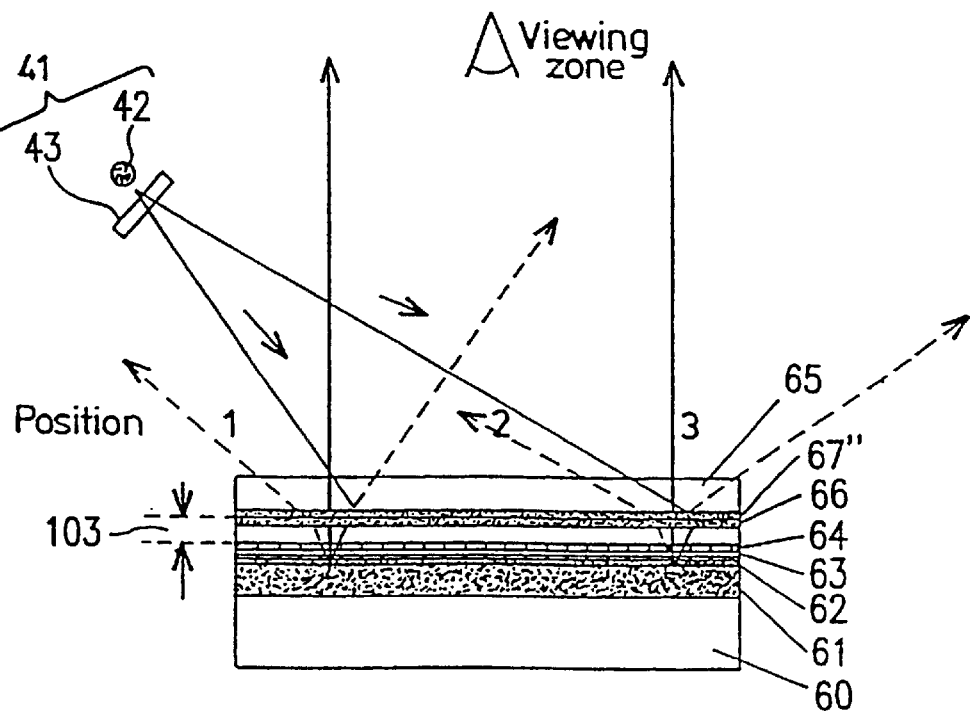
FIG. 25 is a cross-section of an LCD according to a further embodiment of the present invention.

FIG. 25 shows, as a further embodiment of the invention, a cross-sectional view of a possible embodiment of an LCD device employing an internal holographic field lens 67" and an internal polarizer 66 which are spaced apart from the color filter 64 by the thin glass substrate 103. The configuration of FIG. 25 corresponds to that in FIG. 22, but the polarizer 66 is placed within the LCD between the holographic lens 67" and the color filter layer 64.

Figure 26A:
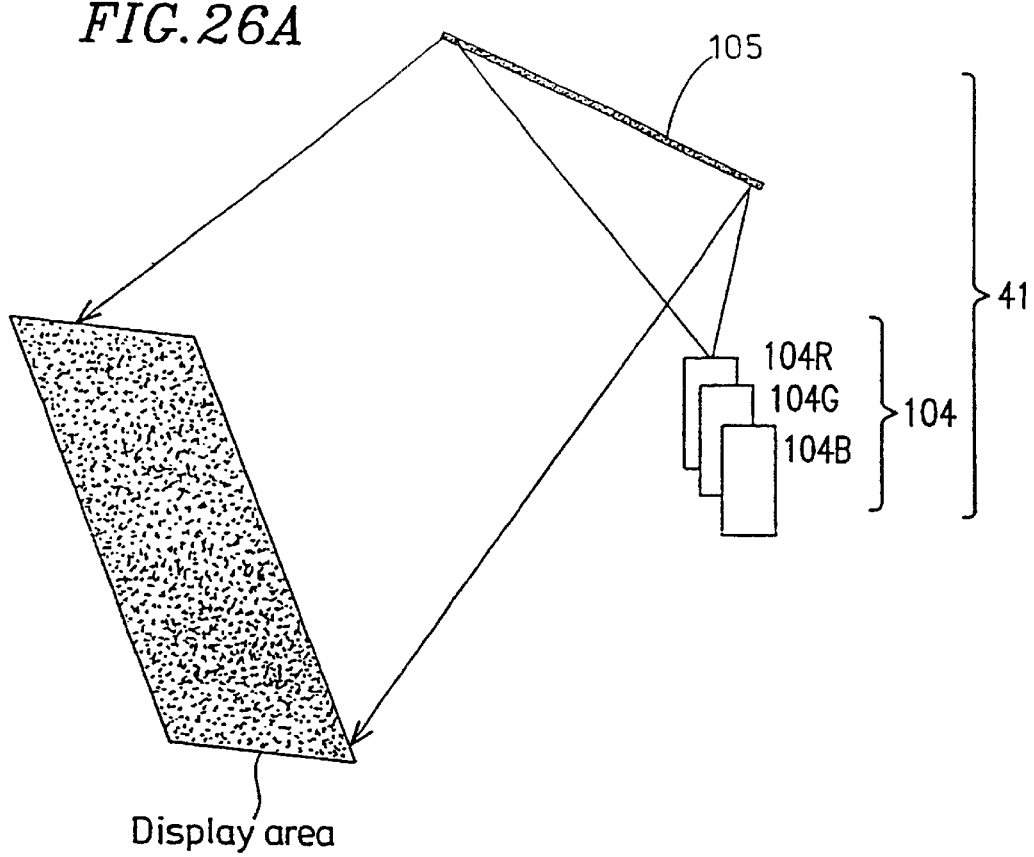
FIG. 26A is a schematic perspective view of a light source according to another embodiment of the present invention.
Figure 26B:
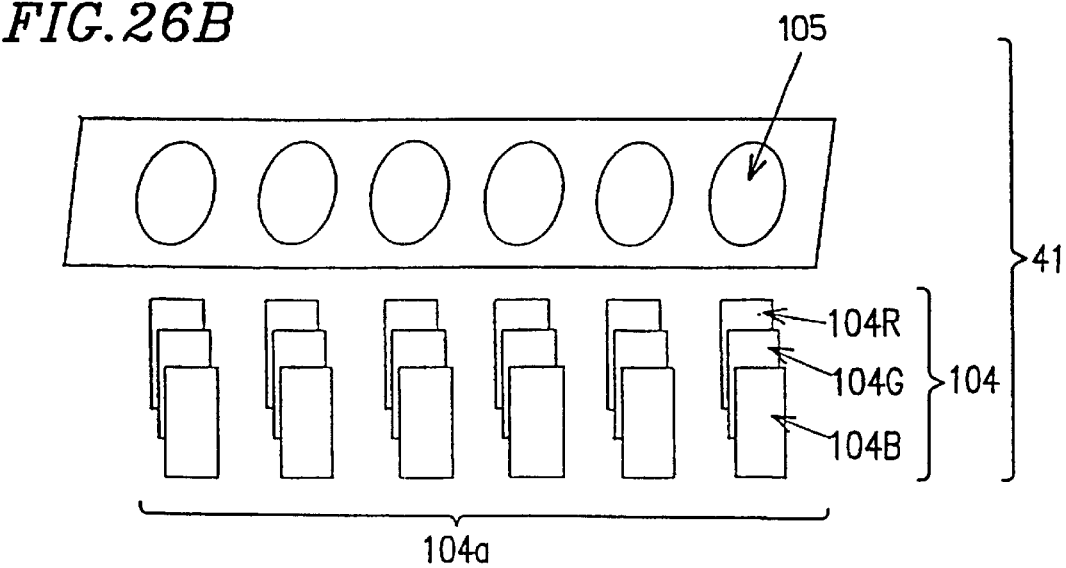
FIG. 26B shows a light source according to another embodiment of the invention.

Each of FIGS. 26A and 26B shows a light source according to the invention. The illustrated light source comprises a reflective LCD (in FIG. 26A, a display area thereof is only illustrated, while the LCD is not shown in FIG. 26B) and a front local light source 41 which can be associated with, for example, the cover of an LCD or with an LCD frame. The local light source 41 of FIG. 26A includes an LED group 104 of a red LED 104R, a blue LED 104B and a green LED 104G, which are spatially separated from one another, whilst that of FIG. 26B includes an array 104a of such groupings 104 each including the red LED 104R, the blue LED 104B and the green LED 104G. The local light source 41 is further provided with a holographic beam homogenizer 105 which can be, for example, a reflective holographic homogenizer having a metallized reflective surface. The homogenizer 105 produces an image of a rectangular diffuser in the plane of a liquid crystal layer having an optical axis coincident with the normal axis to the display surface. The homogenizer 105 incorporates the function of the holographic field lens of the above-described LCDs of this invention. These light sources can thus be used with an LCD that does not have a holographic field lens.

FIGS. 27 to 32 each illustrate further embodiments of light sources that are suitable for use as an auxiliary light source for a reflective LCD.

Figure 27:
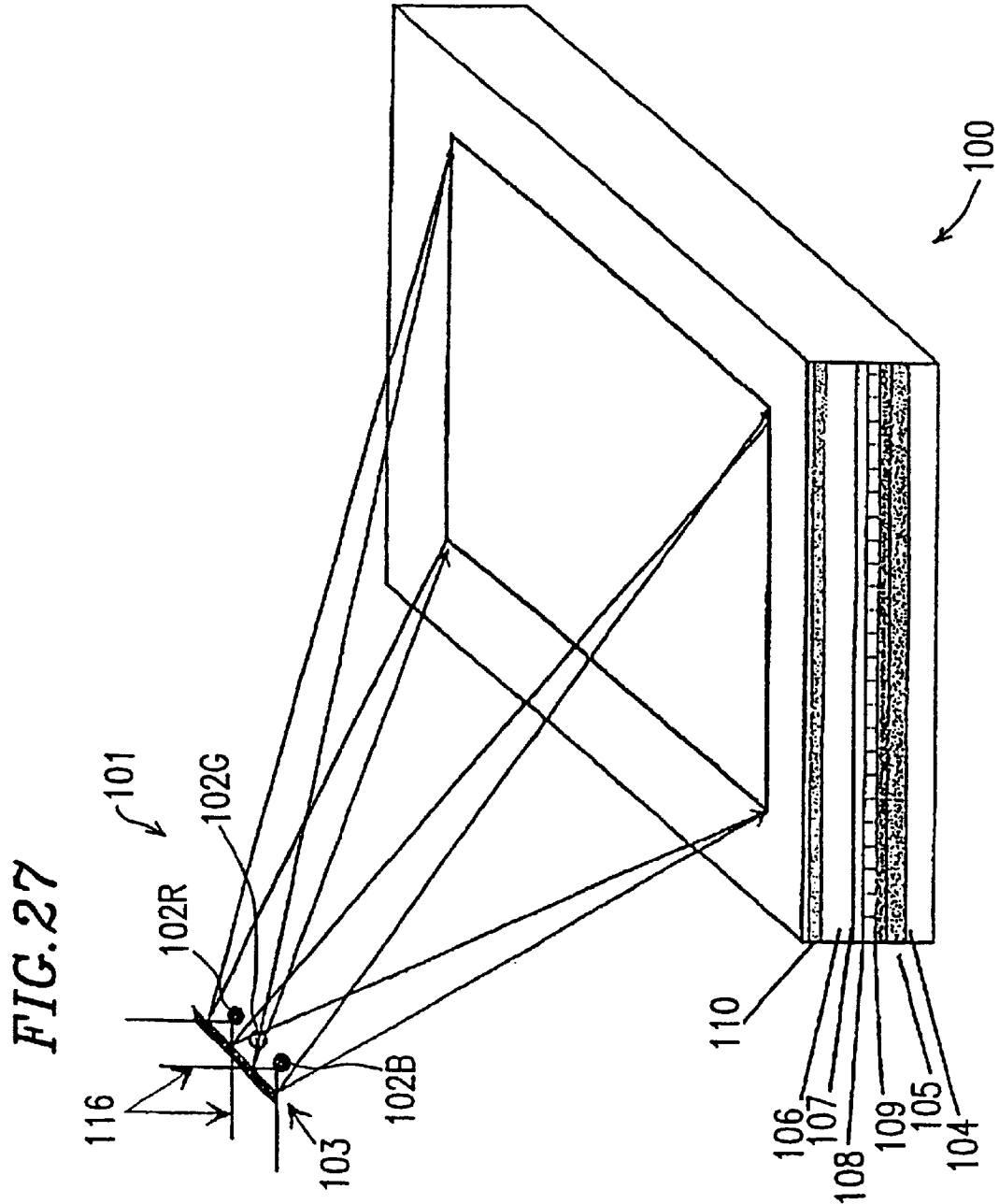
FIG. 27 shows a further embodiment of a light source suitable for use as an auxiliary light source for an LCD.

FIG. 27 illustrates a basic configuration of an illumination system for a reflective LCD employing an array of single color reflection holographic homogenizers. More specifically; FIG. 27 shows a light source 101. In FIG. 27, the light source 101 is acting as an auxiliary light source for an LCD 100, for example in conditions of low ambient illumination. The light source 100 is offset from the axis of the LCD 100, and is spaced close to the LCD 100.

The light source 101 includes red, green and blue light emitting diodes (LEDs) 102R, 102G, 102B. These LEDs 102R, 102G, 102B are disposed in front of an array 103 of single color reflection holographic homogenizers. The array 103 contains at least one homogenizer for blue light, at least one homogenizer for green light, and at least one homogenizer for red light. The homogenizers 103 serve to re-distribute the intensity profile of the light emitted by the LEDs 102R, 102G, 102B, in the manner described with reference to FIG. 6B above.

Some light 116 emitted by the LEDs 102R, 102G, 102B passes through the array 103 of holographic homogenizers without being diffracted. However, some of the light from the LEDs 102R, 102G, 102B incident on the holographic homogenizers 103 is diffracted, and so is reflected towards the LCD 100.

The LCD 100 includes a lower glass substrate 104, on which is disposed a reflective layer (internal mirror) 105 The LCD 100 also comprises an upper glass substrate 106, on which is disposed an ITO electrode layer 107 and color filters 108. A layer of liquid crystal 109 is disposed between the upper and lower substrates 104 and 106. Picture element electrodes and associated switching elements (not shown) are disposed at the interface between the lower substrate 104 and the reflective layer 105, so that an electric field can be applied to the liquid crystal layer 109 by applying a voltage between the electrodes on the substrate 104 and the ITO electrode layer 107.

A linear polarizer 110 is further disposed above the upper substrate 106 of the LCD 100.

The LEDs 102R, 102G, 102B each produce single color images. The LEDs 102R, 102G, 102B and the array 103 of reflective homogenizers are arranged so that the single color images produced by the LEDs 102R, 102G, 102B overlap in the plane of the LCD 100, so that the LEDs 102R, 102G, 102B combine to act as a white light source. Since the intensity profile of the light from the LEDs 102R, 102G, 102B that is diffracted by the array 103 of homogenizers is re-shaped by the homogenizers, the diffracted light forms a uniformly illuminated area on the image plane of the LCD 100.

Figure 28:
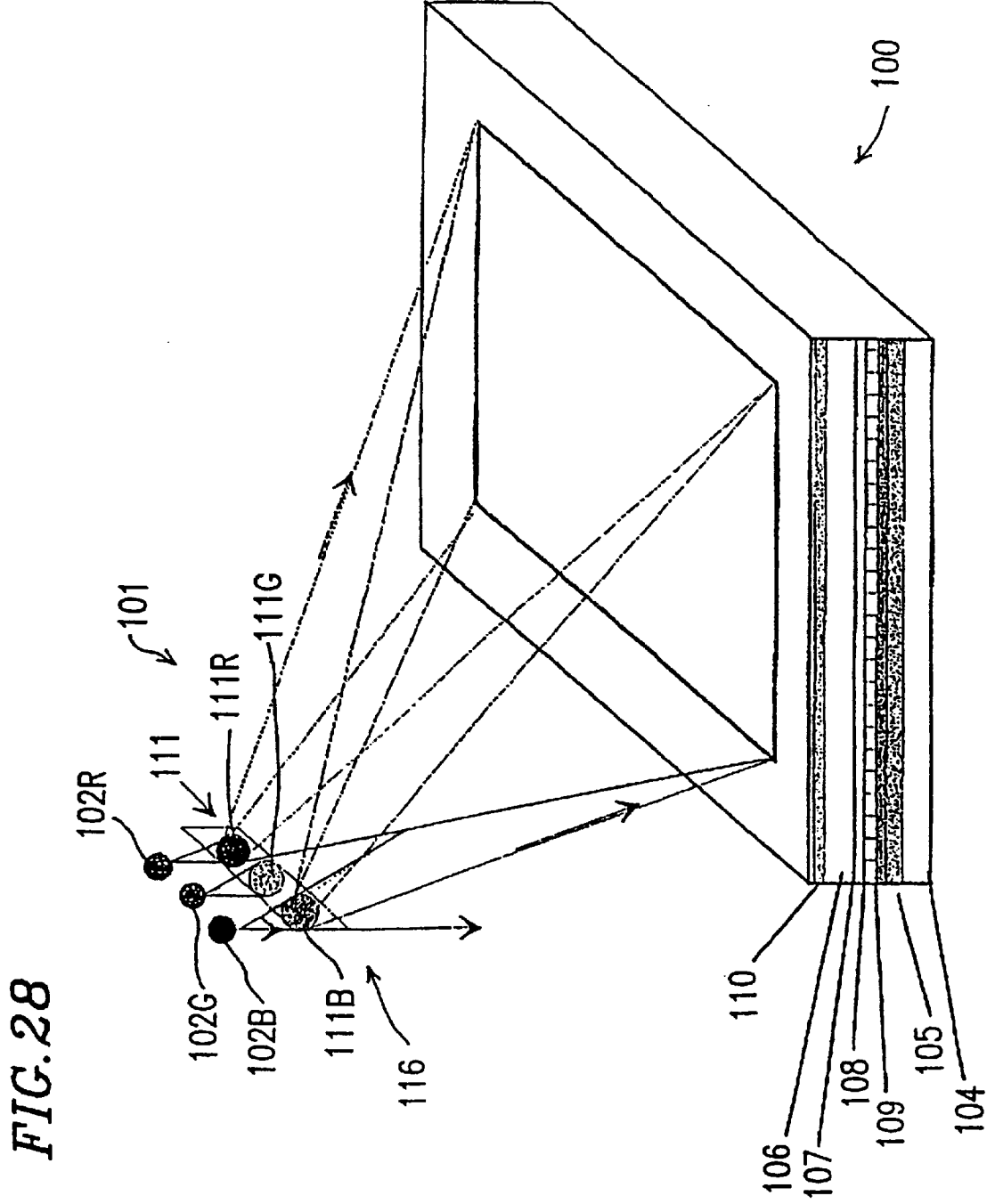
FIG. 28 shows a further embodiment of a light source suitable for use as an auxiliary light source for an LCD.

FIG. 28 illustrates another basic configuration of an illumination system for a reflective LCD employing an array of single color reflection holographic homogenizers.

More specifically, the light source 101 of FIG. 28 is generally similar to that of FIG. 27, except that the array 103 of single color reflective holographic homogenizers of FIG. 27 is replaced by an array 111 of single color transmissive holographic homogenizers 111R, 111G, 111B. The array 111 contains at least one homogenizer for blue light, at least one homogenizer for green light, and at least one homogenizer for red light. The array 111 of transmissive holographic homogenizers is disposed between the LEDs 102R, 102G, 102B and the LCD 100.

Some of the light 116 from the LEDs 102R, 102G, 102B passes through the array 111 of transmissive holographic homogenizers 111 without diffraction, and is lost. However, some light from the LEDs 102R, 102G, 102B is diffracted by the array 111 of transmissive holographic homogenizers, and is directed onto the LCD 100. The single color images produced by the LEDs 102R, 102G and 102B are arranged to overlap in the plane of the LCD 100, so that the light source 101 functions as a white light source. Since the intensity profile of the light from the LEDs 102R, 102G, 102B that is diffracted by the array 111 of homogenizers is re-shaped by the homogenizers, the diffracted light forms a uniformly illuminated area on the image plane of the LCD 100.

The LCD 100 in FIG. 28 has the same configuration as that in FIG. 27. The same elements have the same reference numerals in both FIGS. 27 and 28, and therefore, the descriptions therefor are omitted here.

Figure 29:
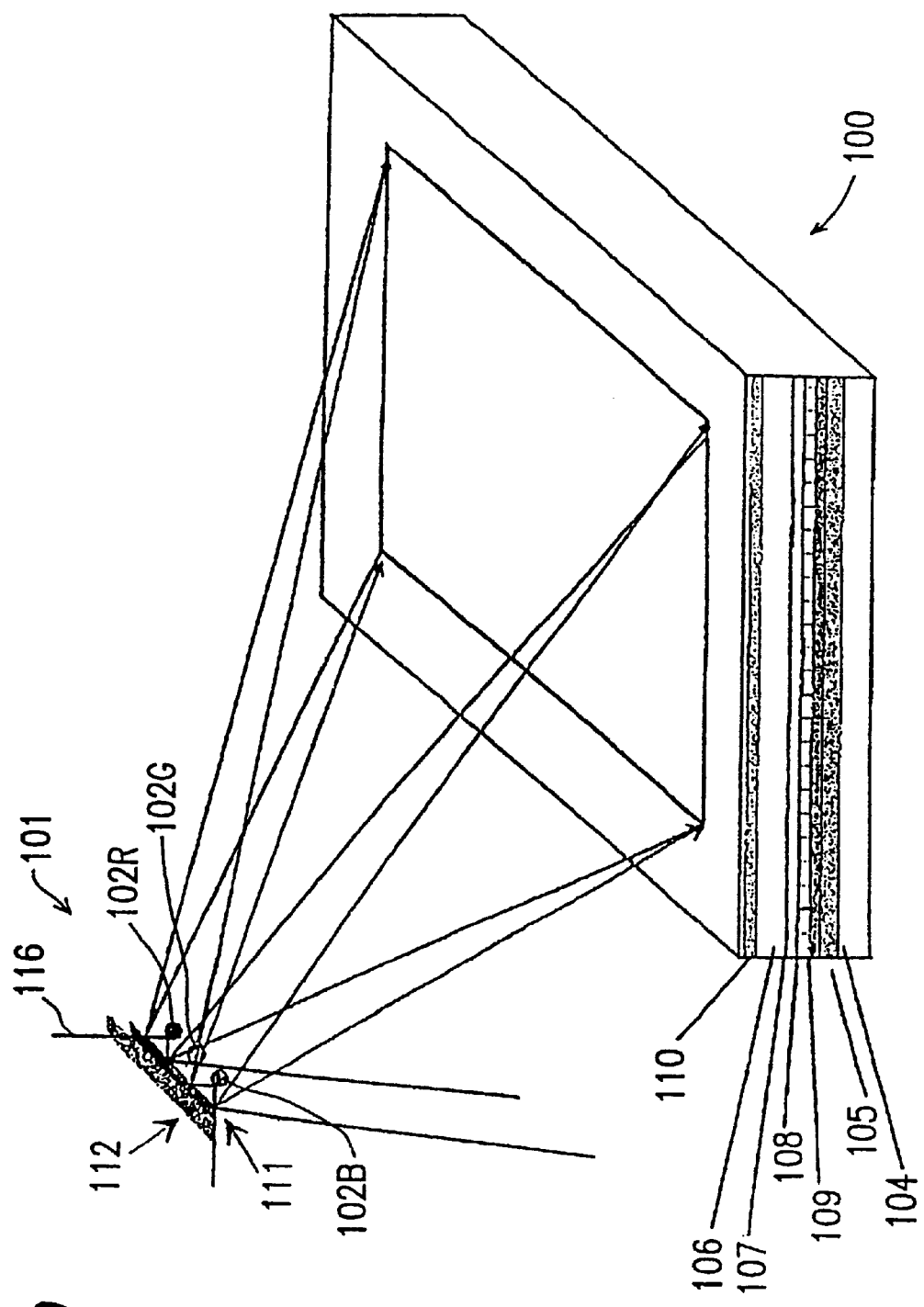
FIG. 29 shows a further embodiment of a light source suitable for use as an auxiliary light source for an LCD.

FIG. 29 illustrates a basic configuration of an illumination system for a reflective LCD employing an array of single color reflection holographic homogenizers backed by a mirror.

More specifically, in the embodiment of FIG. 29, the light source 101 again comprises an array 111 of transmissive holographic homogenizers. In this embodiment, however, the array 111 of holographic homogenizers is disposed behind the LEDs 102R, 102G, 102B.

The light source of FIG. 29 further comprises a mirror 112 disposed behind the array 111 of holographic homogenizers. The mirror 112 is positioned such that light from the LEDs 102R, 102G, 102B that is diffracted when it passes through the array 111 of transmissive holographic homogenizers is directed by the mirror 112 towards the LCD 100. Light 116 from the LEDs 102R, 102G, 102B that passes through the array 111 of holographic homogenizers without diffraction is, however, not directed towards the LCD 100, but is directed by the mirror 112 away from the LCD 100.

As with the embodiments of FIGS. 27 and 28, the single color images formed by the LEDs 102R, 102G and 102B are arranged to overlap in the plane of the LCD 100, so that the light source 101 functions as a white light source. Since the intensity profile of the light from the LEDs 102R, 10ZG, 102B that is diffracted by the array 111 of homogenizers is re-shaped by the homogenizers, the diffracted light forms a uniformly illuminated area on the image plane of the LCD 100.

The LCD 100 in FIG. 29 has the same configuration as those in FIGS. 27 and 28. The same elements have the same reference numerals in these figures, and therefore, the descriptions therefor are omitted here.

Figure 30:
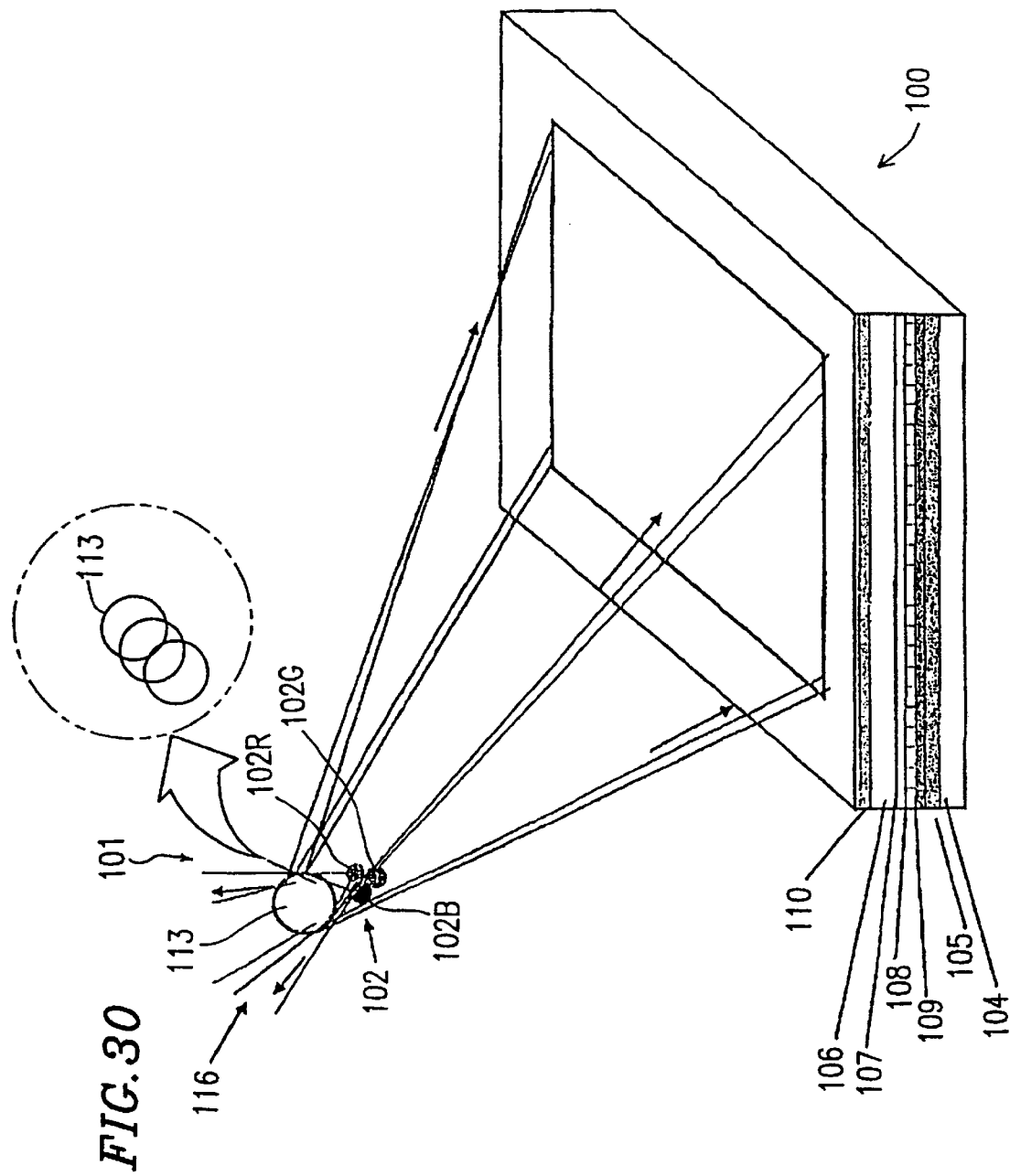
FIG. 30 shows a further embodiment of a light source suitable for use as an auxiliary light source for an LCD.

FIG. 30 illustrates a basic configuration of an illumination system for a reflective LCD employing sandwich-type reflection holographic homogenizers and a compact assembly of single-colored LEDs.

More specifically, in FIG. 30, the light source 101 again comprises red, green and blue LEDs 102R, 102G, 102B. In this embodiment, however, the LEDs 102R, 102G, 102B are arranged in a delta or triangular configuration 102 rather than as a linear array. Sandwich-type single color reflective holographic homogenizers 113 are placed behind the LEDs 102R, 102G, 102B. In FIG. 30, an enlarged view of the sandwich-type single color reflective holographic homogenizers 113 is also shown. In the enlarged view, each circle represents the illumination of a different color onto a sandwich structure of the sandwich-type holographic homogenizers 113.

Light that is diffracted by the holographic homogenizers 113 is directed onto the LCD 100. The holographic homogenizers 113 include three separate homogenizing structures which are either mechanically overlapped in a three-layer sandwich structure, or are wavelength multiplexed In one or more layers, each with different wavelength response, so that light from each LED 102R, 102G, 102B is directed towards the LCD 100. The LEDs 102R, 102G, 102B and the reflective holographic homogenizers 113 are so arranged that the single color images produced by each LED 102R, 102G, 102B overlap in the plane of the LCD 100, so that the light source 101 functions as a white light source. Since the intensity profile of the light from the LEDs 102R, 102G, 102B that is diffracted by the homogenizers 113 is re-shaped by the homogenizers, the diffracted light forms a uniformly illuminated area on the image plane of the LCD 100.

The LCD 100 in FIG. 30 has the same configuration as those in the previous figures. The same elements have the same reference numerals in these figures, and therefore, the descriptions therefor are omitted here.

Figure 31:
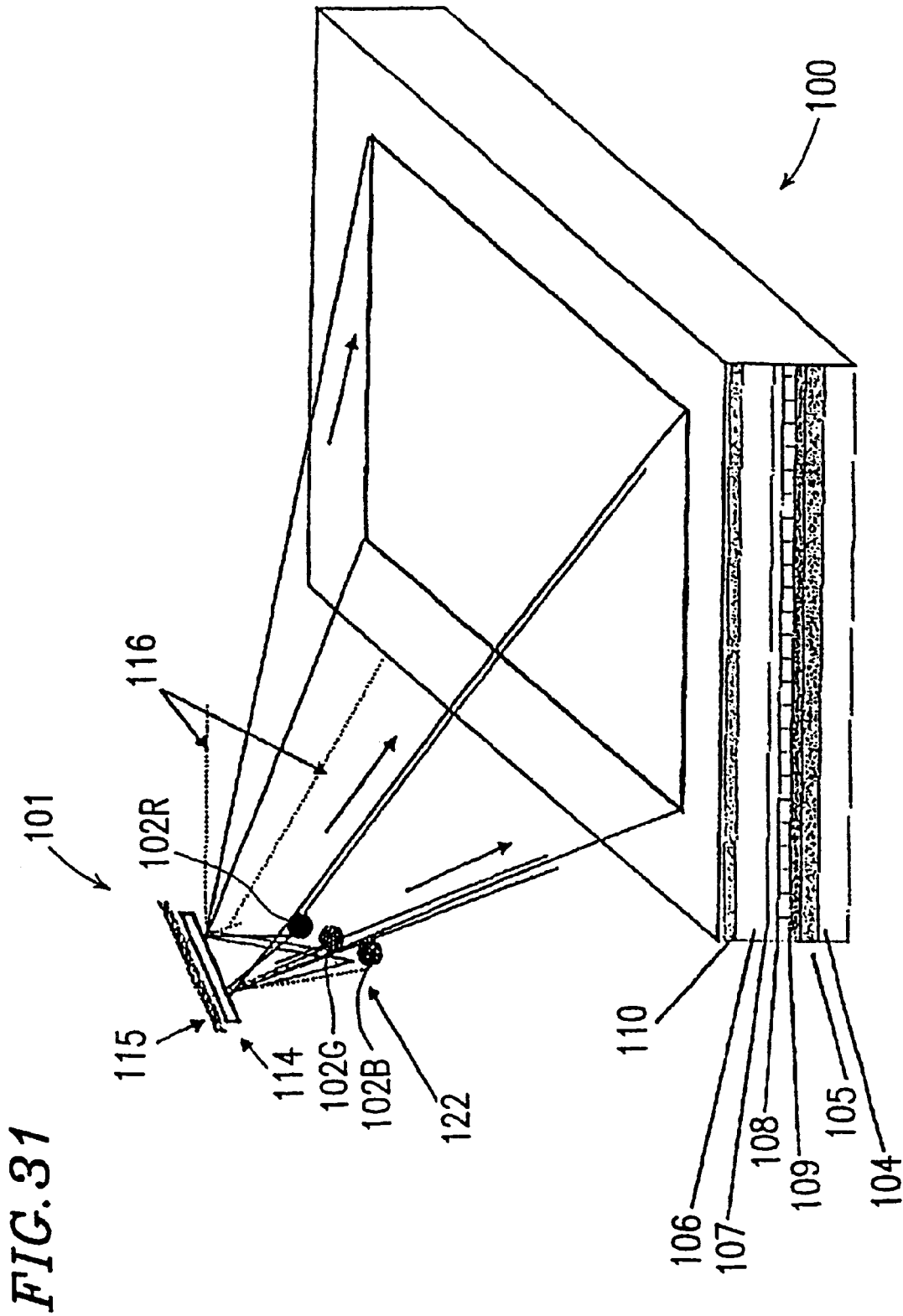
FIG. 31 shows a further embodiment of a light source suitable for use as an auxiliary light source for an LCD.

FIG. 31 illustrates a basic configuration of an illumination system for a reflective LCD employing spatially separated single color LEDs and one transmission holographic homogenizer at an achromatic angle.

More specifically, in the embodiment of FIG. 31, the light source 101 includes an array 122 of single color LEDs 102R, 102G, 102B, arranged in a linear array. The array 122 is disposed at an achromatic angle, and a single transmissive holographic homogenizer 114 is disposed behind the LEDs 102R, 102G, 102B. An achromatic angle refers to the angle connecting two object points that will result in two overlapped images of different wavelengths (See, for example, EOS/SPIE Short Course SC2, "Advanced Display Holography" by S. Benton, Holographic International '92, pages 4–6.)

A reflector 115 is disposed behind the holographic homogenizer 114. Light from the LEDs 102R, 102G, 102B that is diffracted when it passes through the holographic homogenizer 114 is reflected by the reflector 115 so as to be incident on the LCD 100. Light 116 from the LEDs 102R, 102G, 102B that passes through the holographic homogenizer 114 without diffraction is, however, directed away from the LCD 100.

The single color images from the LEDs 102R, 102G, 102B, are combined by the single transmission holographic homogenizer 114 by using its chromatic dispersion to produce white light illumination of the LCD 100. Since the intensity profile of the light from the LEDs 102R, 102G, 102B that is diffracted by the homogenizer 114 is re-shaped by the homogenizer, the diffracted light forms a uniformly illuminated area on the image plane of the LCD 100.

The LCD 100 in FIG. 31 has the same configuration as those in the previous figures. The same elements have the same reference numerals in these figures, and therefore, the descriptions therefor are omitted here.

Figure 32:
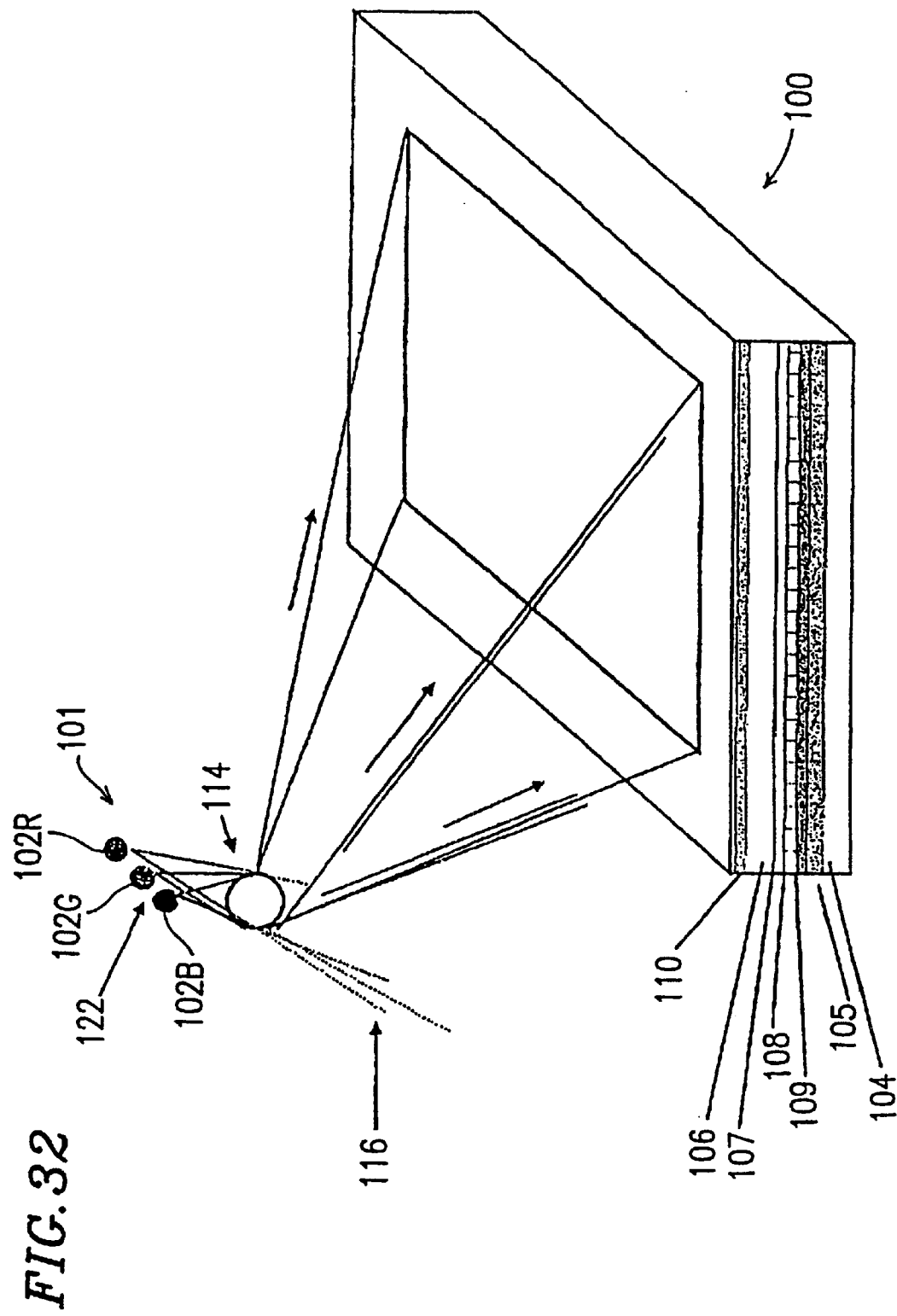
FIG. 32 shows a further embodiment of a light source suitable for use as an auxiliary light source for an LCD.

FIG. 32 illustrates another basic configuration of an illumination system for a reflective LCD employing a spatially separated single color LEDs and one transmission holographic homogenizer at an achromatic angle.

More specifically, the embodiment of FIG. 32 is similar to the embodiment of FIG. 31, in that it uses a linear array 122 of single color LEDs 102R, 102G, 102B disposed at the achromatic angle. In the embodiment of FIG. 32, however, a single transmissive holographic homogenizer 114 is disposed between the LEDs 102R, 102G, 102B and the LCD 100. Light that is diffracted when passing through the holographic homogenizer 114 is directed onto the LCD 100, whereas light 116 that passes through the holographic homogenizer 114 without diffraction is not incident on the LCD 100.

As in the embodiment of FIG. 31, the single color images produced by individual LEDs 102R, 102G, 102B are combined by the single transmission holographic homogenizer 114 by using its chromatic dispersion to produce white light illumination of the LCD 100. Since the intensity profile of the light from the LEDs 102R, 102G, 102B that is diffracted by the single homogenizer 114 is re-shaped by the homogenizer, the diffracted light forms a uniformly illuminated area on the image plane of the LCD 100.

The LCD 100 in FIG. 32 has the same configuration as those in the previous figures. The same elements have the same reference numerals in these figures, and therefore, the descriptions therefor are omitted here.

In the embodiments of FIGS. 27–32, only one red LED 102R, one green LED 102G and one blue LED 102B are shown. However, the invention is not limited to this, and it will be possible for the light sources to contain two or more LED of each color.

The light sources shown in FIGS. 27 to 32 can be used, for example, as auxiliary light sources for a conventional LCD or for an LCD incorporating a holographic field lens.

Although the present invention has been described with reference to preferred embodiments, the invention is not limited to these embodiments. For example, the light source is not limited to an LED but could be, for example, a semiconductor laser, an electro-luminescent display or a microbulb. Moreover, the holographic homogenizing element could be replaced by a refractive optical arrangement, although this would be more bulky than a holographic homogenizing element.

In the above description of the present invention, the layered structure in the display device functions as a spatial light modulator having an optical modulation layer. The optical modulation layer may be a liquid crystal layer mentioned in the above description.

Industrial Applicability

According to the present invention, a holographic field lens as a holographic optical element is disposed substantially in the image plane of the display device.

The holographic field lens has optical power and re-direction properties. Thus, the holographic field lens can convert an incident beam of diverging light to a beam of collimated light, and can also re-direct the incident light. Whereas the hologram layer in the prior art device simply deflects the incident light, and so requires an incident beam of collimated light, the holographic field lens of the present invention simultaneously concentrates incident light and redirects it in a preferred direction, and can be used with a close, offset light source.

The present invention will function when the display device is illuminated with diverging light, as will be the case when it is illuminated by a nearby light source, but this will not be the case for the prior art device.

What is claimed is:

1. A display device comprising:
   a spatial light modulator having an optical modulation layer;
   a reflector disposed behind the optical modulation layer with respect to a display direction; and
   a holographic field lens,
   wherein for a given angle of incidence, the diffraction efficiency of the holographic field lens varies in a gradient manner over the holographic field lens.

2. A display device as claimed in claim 1, wherein the reflector is disposed within the spatial light modulator.

3. A display device as claimed in claim 1, wherein the reflector is a non-Lambertian reflector.

4. A display device as claimed in claim 1, wherein the holographic field lens is adapted to collimate diverging light incident on the holographic field lens.

5. A display device as claimed in claim 4, wherein the collimated light is directed at an angle $\theta$ to the normal axis to the display device, wherein θ is greater half the acceptance angle of the holographic field lens.

6. A display device as claimed in claim 5, wherein θ≧3°.

7. A display device as claimed in claim 1, wherein the holographic field lens is a holographic microlens array.

8. A device as claimed in claim 7, further comprising color filters, wherein the pitch of the holographic microlens array is substantially three times the pitch of the color filters.

9. A display device as claimed in claim 1, wherein the holographic field lens is disposed in front of the optical modulation layer.

10. A display device as claimed in claim 1, wherein the holographic field lens includes the reflector so as to form a single element.

11. A display device as claimed in claim 1, wherein the holographic field lens is disposed within the spatial light modulator.

12. A display device as claimed in claim 1, wherein the holographic field lens is positioned close to the optical modulation layer.

13. A display device as claimed in claim 12, wherein the holographic field lens is separated from the optical modulation layer.

14. A display device as claimed in claim 1, further comprising a light source arranged to illuminate the spatial light modulator with diverging light.

15. A display device as claimed in claim 14, wherein the light source is offset with respect to the spatial light modulator.

16. A display device as claimed in claim 15, wherein the diffraction efficiency of the holographic field lens is lower at the offset side of the light source with respect to the spatial light modulator and is higher at a side away said offset side of the light source.

17. A display device as claimed in claim 14, further comprising a homogenizer disposed in the optical path between the light source and the spatial light modulator.

18. A display device as claimed in claim 17, wherein the homogenizer is a holographic homogenizer.

19. A display device as claimed in claim 18, wherein the homogenizer is a reflective homogenizer.

20. A display device as claimed in claim 19, wherein the homogenizer is a reflective volume holographic homogenizer.

21. A display device as claimed in claim 14, wherein the light source is substantially monochromatic.

22. A display device as claimed in claim 21, wherein the light source is a light-emitting diode.

23. A display device as claimed in claim 14, wherein the light source is a white light source.

24. A display device as claimed in claim 14, wherein the light source comprises at least:
a first light source emitting light at a first wavelength; and
a second light source emitting light at a second wavelength.

25. A display device as claimed in claim 24, wherein the first light source comprises a first light emitting diode for emitting light of the first wavelength, and the second light source comprises a second light emitting diode for emitting light of the second wavelength.

26. A display device as claimed in claim 25,
wherein the holographic field lens is chromatic,
and wherein the first and second light sources are disposed at the respective foci of the holographic field lens for the light of the first wavelength and the light of the second wavelength respectively.

27. A display device as claimed in claim 24,
wherein the holographic field lens is chromatic,
and wherein the first and second light sources are disposed at the respective foci of the holographic field lens for the light of the first wavelength and the light of the second wavelength respectively.

28. A display device as claimed in claim 14, further comprising a cover member, wherein the light source is disposed on the cover member.

29. A display device as claimed in claim 14, further comprising a support member for supporting the light source.

30. A display device as claimed in claim 29, wherein the support member is movable between a stowed position and a position in which the light source is able to illuminate the spatial light modulator.

31. A display device as claimed in claim 1, wherein the optical modulation layer is a liquid crystal layer.

32. An illumination system for illuminating the display device claimed in claim 1, comprising at least one light source, and a holographic homogenizer disposed in the path of light from said at least one light source.

33. An illumination system as claimed in claim 32, wherein the holographic homogenizer is a reflective holographic homogenizer.

34. An illumination system as claimed in claim 32, wherein the holographic homogenizer is a transmissive holographic homogenizer.

35. An illumination system as claimed in claim 34, further comprising a reflector, wherein the transmissive holographic homogenizer is disposed between said at least one light source and the reflector.

36. An illumination system as claimed in claim 32, further comprising first, second and third light sources for emitting light at a first wavelength, a second wavelength and a third wavelength, respectively, wherein the first, second and third light sources are disposed in a linear array.

37. An illumination system as claimed in claim 36, wherein the linear array of light sources is disposed at an achromatic angle to the holographic homogenizer.

38. An illumination system as claimed in claim 36, wherein each of said at least one light source is a light-emitting diode.

39. An illumination system as claimed in claim 32, further comprising first, second and third light sources for emitting light of a first wavelength, a second wavelength and a third wavelength respectively, wherein the first, second and third light sources are arranged in a substantially triangular configuration.

40. An illumination system as claimed in claim 39, wherein each of said at least one light source is a light-emitting diode.

41. An illumination system as claimed in claim 32, wherein each of said at least one light source is a light-emitting diode.

* * * * *